United States Patent [19]
Rodgers et al.

[11] Patent Number: 5,889,982
[45] Date of Patent: Mar. 30, 1999

[54] METHOD AND APPARATUS FOR GENERATING EVENT HANDLER VECTORS BASED ON BOTH OPERATING MODE AND EVENT TYPE

[75] Inventors: Scott Dion Rodgers, Hillsboro; Rohit Vidwans, Beaverton; Joel Huang, Portland; Michael A. Fetterman, Hillsboro; Kamla Huck, Portland, all of Oreg.

[73] Assignee: Intel Corporation, Santa Clara, Calif.

[21] Appl. No.: 498,696

[22] Filed: Jul. 1, 1995

[51] Int. Cl.$^6$ ........................................... G06F 9/00
[52] U.S. Cl. .................................. 395/570; 395/591
[58] Field of Search ............................. 395/375, 570, 395/591; 371/37.8

[56] References Cited

U.S. PATENT DOCUMENTS

| | | | |
|---|---|---|---|
| 4,608,659 | 8/1986 | Bradley et al. | 364/737 |
| 4,779,187 | 10/1988 | Letwin | 395/570 |
| 4,856,004 | 8/1989 | Foster et al. | 371/37.8 |
| 5,404,471 | 4/1995 | Kawano et al. | 395/383 |
| 5,463,745 | 10/1995 | Vidwans et al. | 395/394 |
| 5,517,651 | 5/1996 | Huck et al. | 395/570 |
| 5,625,788 | 4/1997 | Boggs et al. | 395/390 |

OTHER PUBLICATIONS

Tanenbaum; "Structured Computer Organization" 2nd Edition; pp. 10–12, 263–269, 1984.

*Pentium™ Processor User's Manual, vol. 3: Architecture and Programming Manual*, Intel (1993), pp. 1–2 through 1–4, Chapters 9 through 14, Chapter s 16, 22, and 23.

*Primary Examiner*—Parshotam S. Lall
*Assistant Examiner*—Kenneth R. Coulter
*Attorney, Agent, or Firm*—Blakely, Sokoloff, Taylor & Zafman LLP

[57] ABSTRACT

A method and apparatus for handling events, such as those which occur in a processor. An event vector is formed by combining event type information indicating a type of event in the processor and mode information indicating an operating mode of the processor. A microcode event handler vector is generated therefrom, for example, by referencing a lookup table. The microcode event handler vector is then used for invoking a microcode event handler to handle occurrence of these events in the processor. By the formation of an event vector, and the microcode event handler vector, execution performance is increased due to avoiding conditional branching within the processor, such as modem high performance architectures, including those which execute instructions in and out-of-order.

67 Claims, 14 Drawing Sheets

METHOD AND APPARATUS FOR GENERATING EVENT HANDLER VECTORS BASED ON BOTH OPERATING MODE AND EVENT TYPE

BACKGROUND OF THE INVENTION

1. Field of the Invention

The present invention pertains to the field of computer systems. More specifically, this invention relates to creation of microcode exception handler vectors using mode and fault information during execution within a processor.

2. Background Information

Typical prior art computer processors implement in-order instruction execution pipeline. An in-order processor usually fetches an instruction stream from a memory, and executes each instruction in the instruction stream according to a sequential program order. Such in-order instruction execution ensures that data dependencies among the instructions are strictly observed.

A processor may perform out-of-order instruction execution to increase instruction execution performance. Such a performance executes ready instructions in the instruction stream ahead of earlier instructions in the program order that are not ready. A ready instruction is typically an instruction having fully assembled source data in available execution resources.

Such out-of-order execution improves processor performance because the instruction execution pipeline of the processor does not stall while awaiting source data or execution resources for a non-ready instruction. For example, an instruction in the instruction stream may require source data from a processor register, wherein the processor register is loaded by a pending external memory fetch operation. Such an instruction awaiting the results of the external memory fetch does not stall the execution of later instructions in the instruction stream that are ready to execute.

A processor may also perform speculative instruction execution to increase instruction execution performance. Such a processor typically determines a speculative execution branch through a program by predicting the result of branch instructions. Such a processor fetches an instruction stream from a memory, predicts a branch result for each branch instruction, and continues fetching and executing the instruction stream according to the predicted branch result. Such speculative execution increases processor performance because the instruction fetch pipeline does not stall during the resolution of branch instructions.

A processor that performs both speculative and out-of-order instruction execution generates speculative result data in an out-of-order sequence in relation to the original program order. The result data is out-of-order because the instructions that cause generation of the result data are executed out-of-order. The result data is speculative until the branch prediction or predictions that caused speculative execution of the instructions is resolved.

Such a speculative out-of-order processor requires a mechanism for coordinating exceptions that occur during the speculative out-of-order execution of the instructions. These exceptions include, for example, software traps and software faults. An example of a software fault is a page fault during a memory access. An example of a trap is a data breakpoint trap. In addition, such a speculative out-of order processor must coordinate the handing of asynchronous events such as interrupts.

When an exceptions occurs in prior art in-order machines, such as those conforming to the Intel brand processor architecture, a special form of far call, the exception handler call, is performed to the exception handler. This far call pushes a return CS and EIP value on to the stack, pushes an EFLAGS register value onto the stack, and branches to an address specified by a CS and EIP value found in the IDT. One prior art method of handling exceptions is described in chapter 9 of the i486 Programmer's Reference Manual. Intel type architecture exceptions can be grouped into four categories:

Faults—exceptions detected while executing an instruction. The instruction is terminated immediately and those state changes made by the instruction are not committed. Return EIP points to the instruction which caused the exception.

Traps—exceptions detected while executing an instruction which are held pending until instruction execution completes. State changes made by the instruction are committed before the exception is handled. Return EIP points to the instruction following the one which caused the exception.

Software Interrupts—exceptions caused by INTn instruction in the Intel architecture. Return EIP points to the instruction following the INTn.

Hardware Interrupts—exceptions caused by the assertion of the INT or NMI pin. The EIP points to the instruction to be executed after servicing the interrupt.

In addition to the differences in the return EIP value pushed on the stack, each different type of exception can require that different values stored in the EFLAGS register in the Intel architecture processor be pushed and that different protection checks be performed on the value obtained from the IDT. They also may require that certain control registers be loaded with data pertaining to the exception and that a special error code be pushed on to the stack for certain exception types. This requires that microcode perform different actions during the exception handler call based on the type of the exception which occurred.

In addition to these differences, different exception handler call actions are required based on whether the Intel brand processor is in Real, Protected, Virtual-8086, or Virtual Mode Extensions (VME) mode at the time the exception occurred. These differences can include different methods of obtaining the CS and EIP information from the IDT, additional protection checks required in some modes, and different EFLAGS register values after the call based on mode and exception type.

Previous processors compatible with the Intel architecture directed microcode execution to different exception handlers based on the type of exception when the exception was posted, and relied on conditional microcode branches within the exception handers to select among the mode specific actions which might need to be performed. This technique suffers from performance penalties in out-of-order speculative execution processors because of the length of the pipeline and the number of buffers which must be flushed during the occurrence of exceptions. The conditional branches based on mode within each handler also incur a high penalty because of these flushing actions.

Thus, there is a need for a processor which can perform different actions based on mode and exception type occurring in a processor, but yet, avoid conditional branching within exception handlers in order to maintain performance at a high level in a speculative out-of order processor.

SUMMARY

A method and apparatus for handling events, such as those which occur in a processor. An event vector is formed by combining event type information indicating a type of event in the processor and mode information indicating an operating mode of the processor. An event vector is thereby generated, and a microcode event handler vector is generated therefrom. In implemented embodiments, the microcode event handler vector is generated by referencing a lookup table. In implemented embodiments, the lookup table may include the same microcode event handler vectors stored in different locations of the lookup table. The lookup table may also have entries for referencing assists. The microcode event handler vector from the event vector is then used for invoking a microcode event handler to handle occurrence of these events in the processor. By the formation of an event vector, and the microcode event handler vector, execution performance is increased due to avoiding conditional branching within the processor, such as modem high performance architectures, including those which execute instructions in and out-of-order.

In implemented embodiments, the microcode event vector is formed in a retire control circuit and the method is performed upon retirement of execution of instructions in the processor. The microcode event handler vector is generated in a micro instruction sequencer, and the microcode event handler is invoked from the micro instruction sequencer.

The event type information may include information indicating whether an event is a fault, a trap, a hardware interrupt or a software interrupt. The mode information may include whether the processor is operating in real, protected, virtual, or virtual memory extensions operating modes, according to the Intel architecture.

The microcode event handler may be sequenced by a microinstruction sequencing circuit in order for the processor to execute the microcode event handler.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
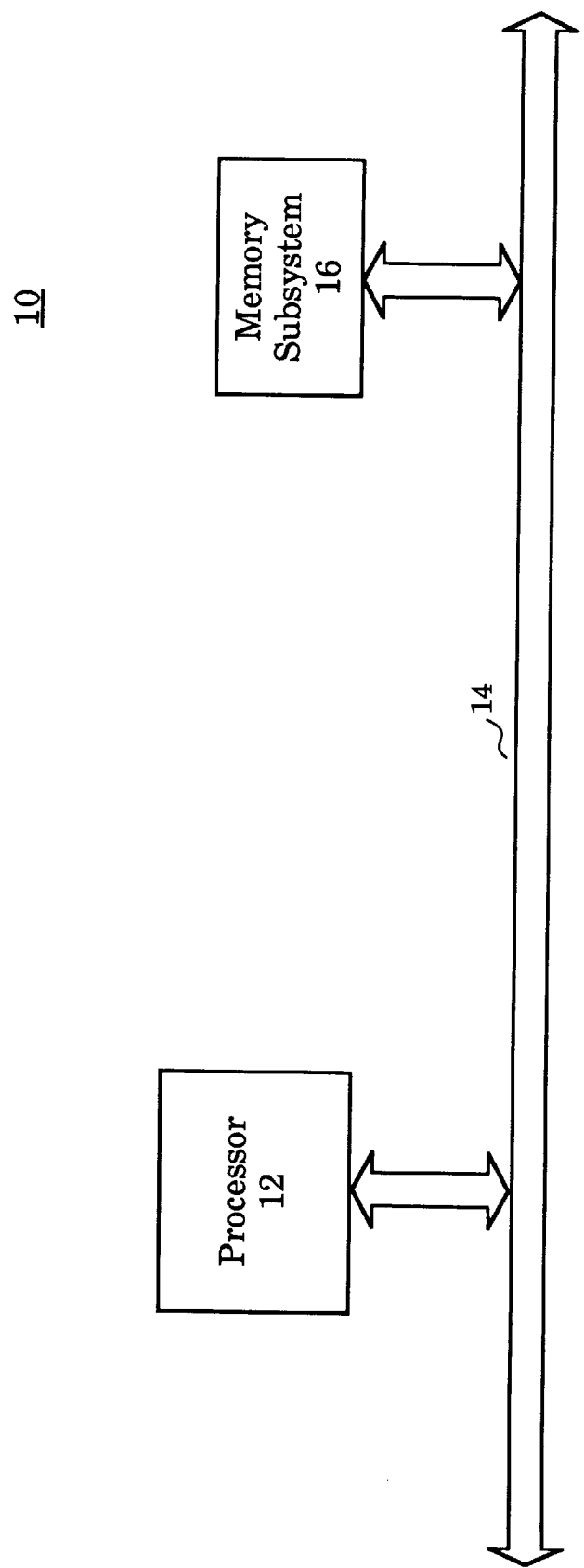
FIG. 1 illustrates a computer system comprising a processor, and a memory subsystem.

FIG. 1 illustrates a computer system 10. The computer system 10 comprises a processor 12 and a memory subsystem 16. The processor 12 and the memory subsystem 16 communicate over a host bus 14.

The processor 12 fetches a stream of instructions from the memory subsystem 16 over the host bus 14. The processor 12 executes the stream of instructions and maintains data storage in the memory subsystem 16.

Figure 2:
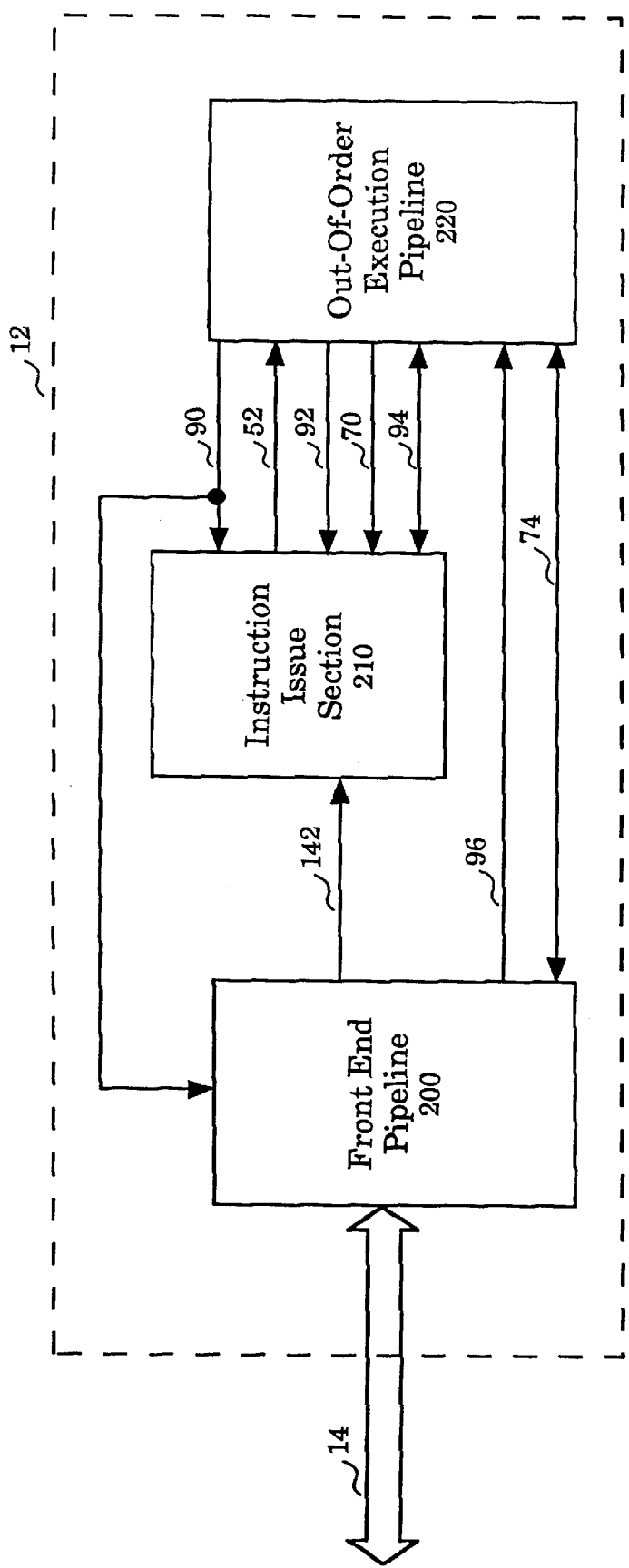
FIG. 2 illustrates the processor for one embodiment which comprises a front end pipeline, an instruction issue section, and an out-of-order execution pipeline.

FIG. 2 illustrates the processor 12 for one embodiment. The processor 12 comprises a front end pipeline 200, an instruction issue section 210, and an out-of-order execution pipeline 220.

The front end pipeline 200 fetches instructions over the host bus 14, performs speculative branch prediction for the instructions, and transfers an in-order stream of instructions to the instruction issue section 210 over a bus 142. The front end pipeline 200 senses external interrupts on the host bus 14 and transfers corresponding interrupt vectors for the external interrupts over an interrupt vector bus 96. The front end pipeline 200 communicates with the out-of-order execution pipeline 220 over a memory access bus 74 during execution of memory load and store operations.

For one embodiment, the instructions fetched by the front end pipeline 200 comprise Intel Architecture Microprocessor instructions. The Intel Architecture Microprocessor instructions operate on a set of architectural registers, including an EAX register, an EBX register, an ECX register, and an EDX register, etc., as well as floating-point registers.

The instruction issue section 210 receives the in-order stream of instructions over the bus 142, and generates an in-order stream of physical micro operations, hereinafter referred to as physical micro-ops. The instruction issue section 210 generates one or more physical micro-ops for each instruction fetched from the memory subsystem 16.

The instruction issue section 210 generates the in-order physical microops by decoding the instructions into logical micro-ops and by renaming the logical register sources and destinations of the logical micro-ops. The instruction issue section 210 tracks the available resources in the out-of-order execution pipeline 220, and assigns the available resources to the physical micro-ops. The instruction issue section 210 transfers the in-order stream of physical micro-ops over a physical micro-op bus 52.

The physical micro-ops are micro operations that perform the function of the corresponding instruction. The physical micro-ops specify arithmetic and logical operations as well as load and store operations to the memory subsystem 16. Each physical micro-op may include 0, 1, or 2 register source operands and 0 or 1 immediate operands. The register sources of the physical micro-ops specify physical registers contained in the out-of-order pipeline 220 that buffer speculative data and committed state registers in the out-of-order pipeline 220 that contain the committed architectural state of the processor 12.

The out-of-order execution pipeline 220 receives the in-order physical micro-ops over the physical micro-op bus 52. The out-of-order execution pipeline 220 executes the physical micro-ops according to the availability of register source data and execution resources.

The out-of-order execution pipeline 220 buffers the speculative result data and the speculative fault status from the out-of-order execution. The out-of-order execution pipeline 220 retires the speculative result data to an architectural state in the same order as the corresponding physical micro-ops are issued by the front end pipeline 200 and checks for exceptions at that time.

The out-of-order execution pipeline 220 signals exceptions by transferring exception vectors to the instruction issue section 210 over an exception vector bus 92. Each exception vector specifies the type of exception. The out-of-order execution pipeline 220 issues a restart control signal 90 to the instruction issue section 210 and the front end pipeline 200 to halt the incoming instruction stream if an exception is detected.

The instruction issue section 210 retrieves exception information over a bus 92 from the out-of-order execution pipeline 220. The instruction issue section 210 implements routines for handling the exceptions, and accordingly issues micro-ops to the out-of-order execution pipeline 220.

Figure 3:
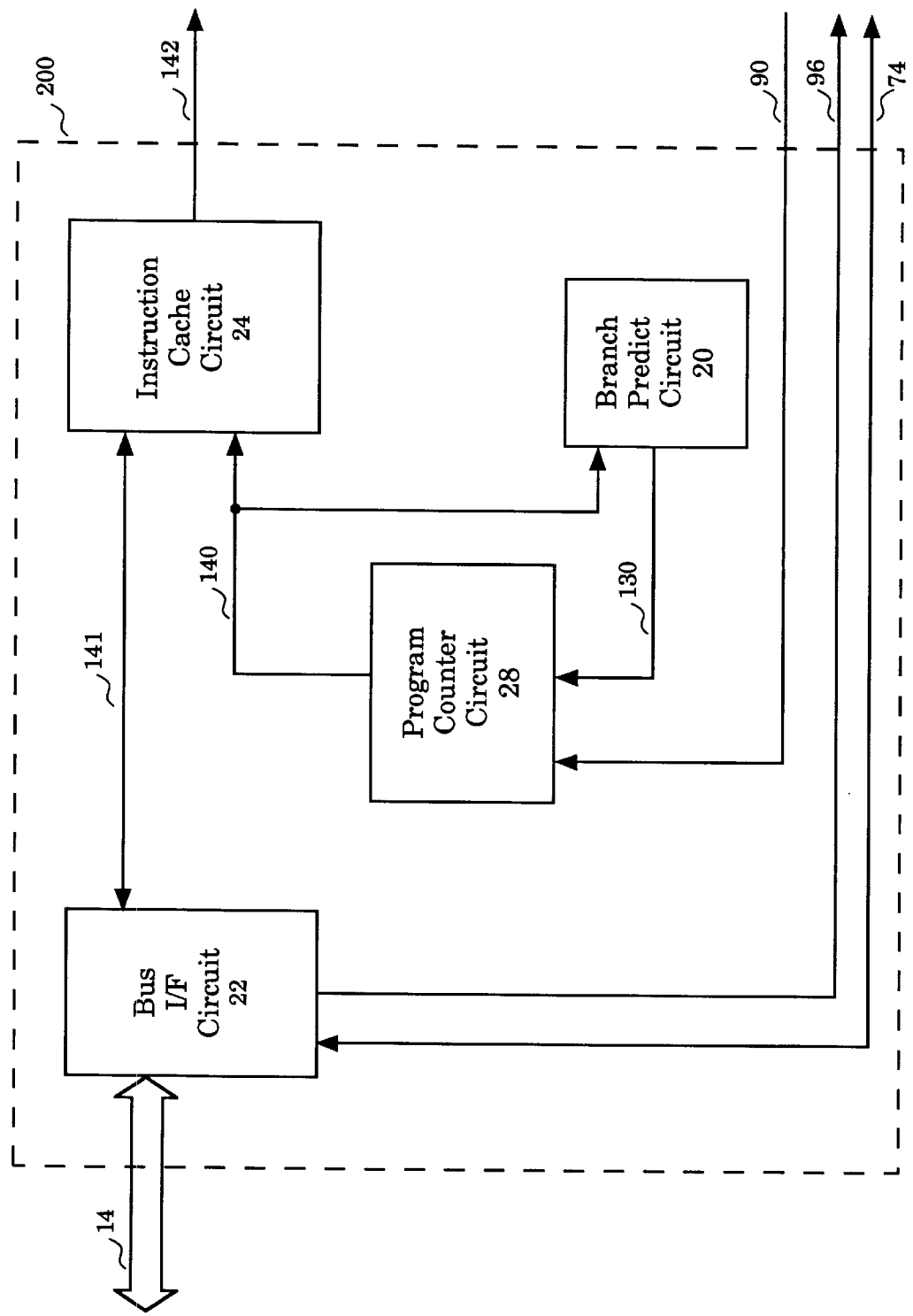
FIG. 3 illustrates the front end pipeline for one embodiment which comprises a bus interface (I/F) circuit, an instruction cache circuit, a program counter circuit, and a branch predict circuit.

FIG. 3 illustrates the front end pipeline 200 for one embodiment. The front end pipeline 200 comprises a bus interface (I/F) circuit 22, an instruction cache circuit 24, a program counter circuit 28, and a branch predict circuit 20.

The instruction cache circuit 24 interfaces to the host bus 14 through the bus interface circuit 22. The instruction cache circuit 24 fetches instructions from the memory subsystem 16 through the bus interface circuit 22 and over a bus 141. The instruction cache circuit 24 buffers the instructions fetched from the memory subsystem 16.

The bus interface circuit 22 senses interrupts on the host bus 14. The bus interface circuit 22 transfers interrupt vectors over the interrupt vector bus 96 to the out-of-order execution pipeline 220. The interrupt vectors on the interrupt vector bus 96 identify the external interrupts on the host bus 14.

The bus interface circuit 22 enables the out-of-order execution pipeline 220 to communicate over the host bus 14 through the memory access bus 74. The out-of-order execution pipeline 220 accesses the memory subsystem 16 through the bus interface circuit 22 during execution of memory load and store operations.

The program counter circuit 28 controls the sequence of instruction flow from the instruction cache circuit 24. The program counter circuit 28 transfers instruction addresses over a program counter bus 140. The instruction addresses cause the instruction cache circuit 24 to transfer a stream of instructions to the instruction decode circuit 26 over the bus 142 in a sequential program order.

The program counter circuit 28 receives the restart control signal 90 from the out-of-order execution pipeline 220 indicating detection of an exception. The restart control signal 90 causes the program counter circuit 28 to halt the transfer of instruction addresses over the program counter bus 140 and halt the instruction stream from the instruction cache circuit 24.

The branch predict circuit 20 predicts the branches in the stream of instructions accessed from the instruction cache circuit 24. The branch predict circuit 20 receives the instruction addresses on the program counter bus 140, and generates predicted target addresses based upon the instruction addresses. The branch predict circuit 20 transfers the predicted target addresses to the program counter circuit 28 over a branch target bus 130.

Figure 4:
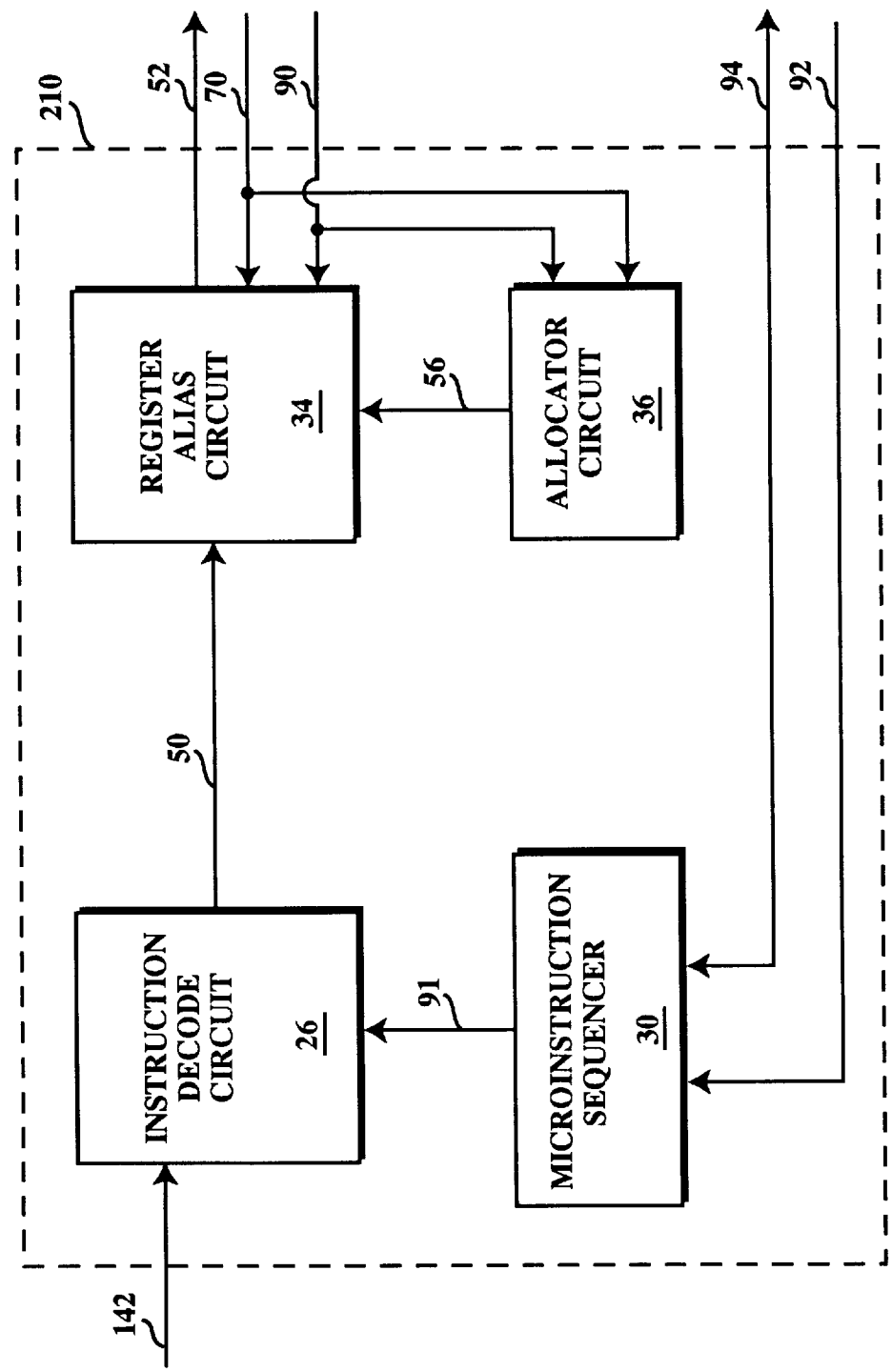
FIG. 4 illustrates the instruction issue section for one embodiment which comprises an instruction decode circuit, a microinstruction sequencer, a register alias circuit, and an allocator circuit.

FIG. 4 illustrates the instruction issue section 210 for one embodiment. The instruction issue section 210 comprises an instruction decode circuit 26, a microinstruction sequencer 30, a register alias circuit 34, and an allocator circuit 36. The instruction decode circuit 26 receives the in-order stream of instructions from the instruction cache circuit 24 over the bus 142, and converts the instructions into an in-order stream of logical micro-ops. The instruction decode circuit 26 generates one or more logical micro-ops for each instruction from the instruction cache circuit 24.

The logical micro-ops generated by the instruction decode circuit 26 are micro operations that perform the function of the corresponding instruction. The logical micro-ops specify arithmetic and logical operations as well as load and store operations to the memory subsystem 16. Each logical micro-op may specify register source operands and/or immediate data operands.

The instruction decode circuit 26 transfers the in-order stream of logical micro-ops to the register alias circuit 34 over a logical micro-op bus 50. For one embodiment, the instruction decode circuit 26 issues up to four in-order logical micro-ops during each clock cycle of the processor 12.

Each logical micro-op on the logical micro-op bus 50 comprises an opcode, a pair of logical register sources and a logical register destination, a set of flow markers, immediate data, and an instruction pointer delta value. The opcode specifies a function for the corresponding logical micro-op. Each logical register source may specify a register source for operand data, and the logical register destination may specify a register destination for result data for the corresponding logical micro-op. The logical register sources and the logical register destinations of the logical micro-ops correspond to the architectural registers of the original instructions.

The flow markers indicate the boundaries of the original instructions corresponding to the logical micro-ops. The original instructions are also referred to as macro instructions. The flow markers include a beginning of macroinstruction (BOM) flow marker and an end of macroinstruction (EOM) flow marker. The BOM flow marker indicates that the corresponding logical micro-op is the first logical micro-op of a macroinstruction, and the EOM marker indicates that the corresponding logical micro-op is the last logical micro-op of the macroinstruction. If a macroinstruction maps to only one logical micro-op, then that logical micro-op carries both the BOM and the EOM flow markers.

The instruction pointer delta value for a logical micro-op indicates the length in bytes of the corresponding macroinstruction. For example, each logical micro-op corresponding to a four byte macroinstruction has a macroinstruction pointer delta value equal to four.

The register alias circuit 34 receives the in-order logical micro-ops over the logical micro-op bus 50, and generates a corresponding set of in-order physical micro-ops by renaming the logical register sources and the logical register destinations of the logical micro-ops. The allocator circuit 36 tracks the available resources the out-of-order execution pipeline 220. The allocator circuit 36 assigns resources in the out-of-order execution pipeline 220 to the physical micro-ops transferred over the physical micro-op bus 52.

The register alias circuit 34 implements a register alias table that specifies whether the current state for each architectural register is speculatively held in the out-of-order execution pipeline 220 or is retired to a committed state register in the out-of-order execution pipeline 220.

The register alias table enables logical to physical register renaming by mapping the logical register sources and destinations to the physical register sources and destinations. The physical register sources and destinations of the physical micro-ops specify reorder buffer (ROB) entries and committed state registers of the out-of-order execution pipeline 220.

The entries in the register alias table correspond to the architectural registers of the original instruction stream. For one embodiment, the entries of the register alias table correspond to the EAX, EBX, ECX, and EDX, etc. registers of the Intel Architecture Microprocessor.

Each entry in the register alias table stores a ROB pointer. The ROB pointer specifies a ROB entry in the out-of-order execution pipeline 220 assigned to buffer the speculative result data for the corresponding architectural register. Each entry in the register alias table also stores a real register file valid (rrfv) flag that indicates whether the speculative result data for the corresponding architectural register is contained in the appropriate committed state register in the out-of-order execution pipeline 220.

The allocator circuit 36 transfers a set of assigned physical register destinations pdst_0 through pdst_3 to the register alias circuit 34 over a physical destination bus 56. The assigned physical register destinations pdst_0 through pdst_3 specify ROB entries in the out-of-order execution pipeline 220 for buffering speculative results for the physical micro-ops. The assigned physical register destinations pdst_0 through pdst_3 are stored in the register alias table and are used by the register alias circuit 34 to rename the logical register destinations of the logical micro-ops into physical register destinations.

The allocator circuit 36 assigns the ROB entries of the out-of-order execution pipeline 220 to the physical micro-ops in the same order that logical micro-ops are received over the logical micro-op bus 50. The allocator circuit 36 maintains an allocation pointer for allocating ROB entries. The allocator circuit 36 receives retirement pointers and valid signals over the retire control bus 70, and accordingly deallocates retired ROB entries. The deallocated ROB entries become available for reallocation.

The register alias circuit 34 receives a set of in-order logical micro-ops lmop_0 through lmop_3 over the logical micro-op bus 50 during each pipeline clock of the processor 12. Each logical micro-op lmop_0 through lmop_3 comprises an opcode, a pair of logical register sources lsrc1 and lsrc2, and a logical register destination ldst, immediate data, a set of flow markers, and an instruction pointer delta value. The logical register sources and the logical register destination each specify an architectural register of the original stream of instructions.

The register alias circuit 34 transfers a corresponding set of in-order physical micro-ops pmop_0 through pmop_3 over the physical micro-op bus 52. Each physical micro-op comprises the opcode of the corresponding logical micro-op, a pair of physical register sources psrc1 and psrc2, a physical register destination pdst, and the flow markers, immediate data, and the instruction pointer delta value of the corresponding logical micro-op. Each physical register destination pdst specifies a ROB entry in the out-of-order execution pipeline 220 to hold speculative result data for the corresponding physical micro-op.

The physical register sources psrc1 and psrc2 each specify a ROB entry or a committed state register in the out-of-order execution pipeline 220. Each of the physical register sources psrc1 and psrc2 on the physical micro-op bus 52 includes a corresponding rrfv flag. The rrfv flag indicates whether the corresponding physical register source specifies a ROB entry or a committed state register.

The register alias circuit 34 generates the physical micro-ops by mapping the logical register sources of the logical micro-ops to the ROB entries and the committed state registers of the out-of-order execution pipeline 220 according to the register alias table. The register alias circuit 34 merges assigned physical register destinations pdst_0 through pdst_3 into the physical register destinations pdst of the physical micro-ops pmop_0 through pmop_3.

The register alias circuit 34 determines a physical register source for a physical micro-op by reading the register alias table entry specified by the corresponding logical register source. If the rrfv flag of the specified register alias table entry is not set, then the register alias circuit 34 transfers the ROB pointer from the specified register alias table entry along with the corresponding rrfv flag over the physical micro-op bus 52 as the physical register source. If the rrfv flag of the specified entry is set, then the register alias circuit 34 transfers a pointer to the committed state register in the out-of-order execution pipeline 220 that corresponds to the logical register source as the physical register source, and transfers the corresponding rrfv flag over the physical micro-op bus 52.

The register alias circuit 34 stores the physical register destinations pdst_0 through pdst_3 into the ROB pointer fields of the register alias table entries specified by the logical register destinations ldst of the logical micro-ops lmop_0 through lmop_3, and clears the corresponding rrfv flags. The clear rrfv flag indicates that the current state of the corresponding registers are assigned to ROB entries in the out-of order execution pipeline 220 as specified by the corresponding ROB pointers.

For example, the register alias circuit 34 generates the physical register source psrc1 for the physical micro-op pmop_0 by reading the register alias table entry specified by the logical register source lsrc1 of the lmop_0. If the rrfv flag of the specified register alias table entry is not set, then the register alias circuit 34 transfers the ROB pointer from the specified register alias table entry along with the corresponding rrfv flag over the physical micro-op bus 52 as the physical register source psrc1 for the pmop_0. If the rrfv flag of the specified register alias table entry is set, then the register alias circuit 34 transfers a pointer to the committed state register that corresponds to the logical register source lsrc1 along with the rrfv flag over the physical micro-op bus 52 as the physical register source psrc1 for the pmop_0.

The register alias circuit 34 generates the physical register source psrc2 for the physical micro-op pmop_0 by reading the register alias table entry specified by the logical register source lsrc2 of the lmop_0. If the rrfv flag of the specified register alias table entry is not set, then the register alias circuit 34 transfers the ROB pointer from the specified entry along with the corresponding rrfv flag over the physical micro-op bus 52 as the physical register source psrc2 for the pmop_0. If the rrfv flag is set, then the register alias circuit 34 transfers a pointer to the committed state register that corresponds to the logical register source lsrc2 along with the rrfv flag over the physical micro-op bus 52 as the physical register source psrc2 for the pmop_0.

The register alias circuit 34 stores the allocated physical register destination pdst_0 into the ROB pointer field of the register alias table entry specified by the logical register destination ldst of the lmop_0, and clears the corresponding rrfv flag. The register alias circuit 34 also transfers the allocated physical register destination pdst_0 over the physical micro-op bus 52 as the physical destination pdst for the physical micro-op pmop_0.

The register alias circuit 34 receives retirement pointers and valid signals over the retire control bus 70. The register alias circuit 34 accordingly updates the register alias table entries corresponding to the retired ROB entries. The register alias circuit 34 updates the rrfv flags of the register alias table entries for the retired ROB entries to indicate that the corresponding registers are held in a committed state register in the out-of-order execution pipeline 220.

The microinstruction sequencer 30 implements microcode for handling events, which include both exceptions and assists, detected in the out-of-order execution pipeline 220 during execution of micro-ops that correspond to instructions fetched from the memory subsystem 16. The microinstruction sequencer 30 also implements microcode that emulates the interrupt service mechanism for the processor 12. For one embodiment, the microinstruction sequencer 30 emulates the interrupt service mechanism of the Intel Microprocessor Architecture.

The microinstruction sequencer 30 receives an exception vector from the outof-order execution pipeline 220 over the exception vector bus 92 if an exception is detected. The microinstruction sequencer 30 then uses this information to select an exception handler and issue micro-ops to the instruction decode circuit 26 to handle the specified exception. The exception handling micro-ops issued by the microinstruction sequencer 30 are decoded and renamed and executed in the out-of-order execution pipeline 220 in the same manner as other logical micro-ops.

Figure 5:
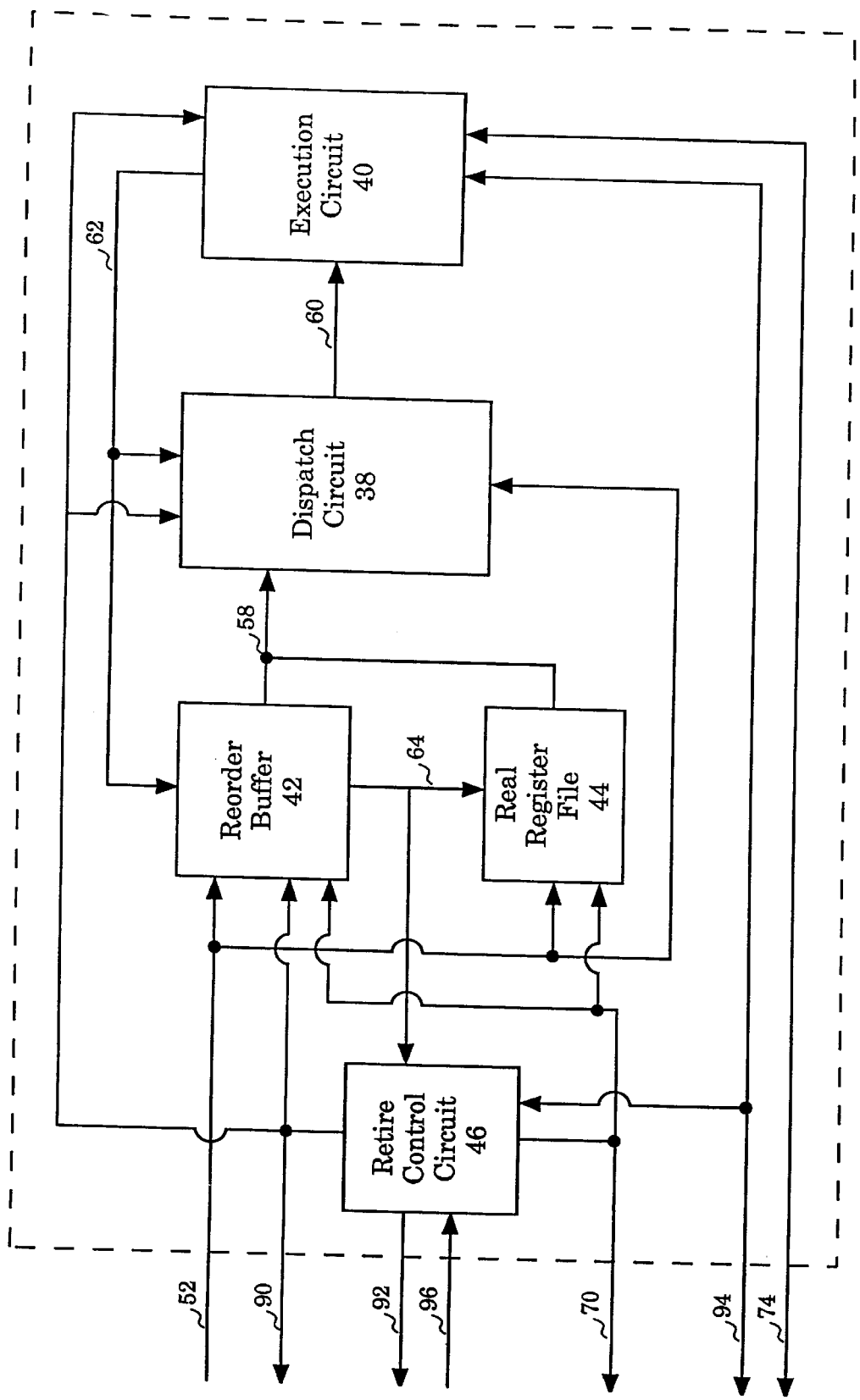
FIG. 5 illustrates the out-of-order execution pipeline for one embodiment which comprises a reorder buffer, a real register file, a retire control circuit, a dispatch circuit, and an execution circuit.

FIG. 5 illustrates the out-of-order execution pipeline 220 for one embodiment. The out-of-order execution pipeline 220 comprises a reorder buffer 42, a real register file 44, a retire control circuit 46, a dispatch circuit 38, and an execution circuit 40.

The dispatch circuit 38 buffers the physical micro-ops awaiting execution by an execution circuit 40. The dispatch circuit 38 receives the opcodes and physical register destinations for the physical micro-ops over the physical micro-op bus 52 and stores the opcodes and physical register destinations into reservation station entries assigned by the allocator circuit 36. The dispatch circuit 38 assembles source data for the physical micro-ops, and dispatches the physical micro-ops to appropriate execution units in the execution circuit 40 according to availability of source data and execution resources.

The reorder buffer 42 contains the ROB entries that buffer speculative results for the physical micro-ops. Each ROB entry in the reorder buffer 42 can buffer either integer or floating-point result data values. Each ROB entry contains a valid flag that indicates whether the corresponding result data value is valid.

The real register file 44 contains committed state registers that hold the committed state of the architectural registers of the original stream of instructions. The committed result data values in the committed state registers always provide valid source data. Each physical register source specifies either a ROB entry or a committed state register.

The reorder buffer 42 and the real register file 44 receive the physical micro-ops over the physical micro-op bus 52. The physical register sources psrc1 and psrc2 of each physical micro-op can each specify either a ROB entry in the reorder buffer 42 or a committed state register in the real register file 44. Each physical register source psrc1 and psrc2 on the physical micro-op bus 52 includes a real register file valid (rrfv) flag that indicates whether the corresponding physical register source specifies a ROB entry or a committed state register.

The reorder buffer 42 reads the result data values and corresponding valid flags from the ROB entries specified by the physical register sources psrc1 and psrc2 of each physical micro-op pmop_0 through pmop_3. The reorder buffer 42 transfers the result data values and corresponding valid flags to the dispatch circuit 38 over a source data bus 58.

The real register file 44 reads the result data values from the committed state registers specified by the physical register sources psrc1 and psrc2 of each physical micro-op pmop_0 through pmop_3. The real register file 44 transfers the result data values to the dispatch circuit 38 over the source data bus 58. The result data values from the real register file 44 have corresponding valid flags that indicate valid data.

The physical register destinations of the physical micro-ops on the physical micro-op bus 52 specify ROB entries in the reorder buffer 42 for buffering result data from execution of the physical micro-ops. Logical register destinations (LDST) and physical register destinations (PDST) travel with the physical micro-ops and are stored into ROB entries. The reorder buffer 42 clears the ROB entries specified by the physical register destinations pdst of each physical micro-op pmop_0 through pmop_3. The reorder buffer 42 then stores the logical register destinations (LDST) of the physical micro-ops into the newly allocated ROB entries.

The dispatch circuit 38 receives the source data values and corresponding valid flags over the source data bus 58. The dispatch circuit 38 stores the source data values and corresponding valid flags into the reservation station entries assigned to the corresponding physical micro-ops.

The dispatch circuit 38 also receives source data values and corresponding valid flags for the pending physical micro-ops from the execution circuit 40 over a result bus 62 during a write back of result data values from the execution circuit 40 to the reorder buffer 42. The dispatch circuit 38 stores the write back source data values and corresponding valid flags into the reservation station entries assigned to the corresponding physical micro-ops.

The dispatch circuit 38 schedules the physical micro-ops having completely assembled source data values for execution. The dispatch circuit 38 dispatches the ready physical micro-ops to the execution circuit 40 over a micro-op dispatch bus 60. The dispatch circuit 38 schedules execution of physical micro-ops out-of-order according to the availability of the source data values for the physical micro-ops, and according to the availability of execution unit resources in the execution circuit 40.

The execution circuit 40 writes back the speculative result data values and exception status from the out-of-order execution of the physical micro-ops to the reorder buffer 42 over the result bus 62. The writes back of speculative result data values and exception status by the execution circuit 40 is out-of-order due to the out-of-order dispatching of physical micro-ops by the dispatch circuit 38 and the differing number of processor cycles of the processor 12 required for execution of the differing types of physical micro-ops.

For one embodiment, the execution circuit 40 comprises a set of five execution units, and the dispatch circuit 38 dispatches up to five physical micro-ops concurrently to the execution circuit 40 over the micro-op dispatch bus 60.

The retire control circuit 46 controls a retirement operation during each cycle of the processor 12 pipeline clock. During each retirement operation, the speculative results held in the reorder buffer 42 are committed to an architectural state in the same order as the original logical micro-ops were received. During retirement, the speculative result data values from a sequential set of ROB entries are transferred to the corresponding committed state registers of the real register file 44 over a retire data bus 64.

The retire control circuit 46 controls the retirement of speculative results stored in the reorder buffer 42. During each cycle of the processor 12, the retire control circuit 46 transfers a retirement pointer over the retire control bus 70. The retirement pointer specifies a set of ROB entries in the reorder buffer 42 for a retirement operation. The retirement pointer on the retire control bus 70 causes the reorder buffer 42 to transfer the result data, exception data, flow markers, and instruction pointer delta values from the specified ROB entries over the retire data bus 64.

The retire control circuit 46 receives the result data, exception data, flow markers, and instruction pointer delta values over the retire data bus 64, and determines whether an exception corresponds to any of the retiring micro-ops. The retire control circuit 46 also receives interrupt vectors over the interrupt vector bus 96 indicating any external interrupt. The retire control circuit 46 also receives machine check signals and inputs from external debug pins of the processor 12 over the interrupt vector bus 96. The machine checks include, for example, any parity errors detected during data transfer over the host bus 14.

The retire control circuit 46 transfers an exception vector to the microinstruction sequencer 30 over the exception vector bus 92 if an exception is detected. The retire control circuit 46 issues the restart control signal 90 if an exception is detected. The exceptions specified by the exception vector include such events as faults, traps, software traps, external interrupts, machine checks, and assists.

The restart control signal 90 causes the program counter circuit 28 to halt the incoming instruction stream. The restart control signal 90 clears the speculative result data in the reorder buffer 42. The restart control signal 90 clears the pending physical micro-ops in the dispatch circuit 38 and the physical micro-ops executing in the execution circuit 40. The restart control signal 90 resets the register alias circuit 34 to map all architectural registers to the corresponding committed state registers in the real register file 44. The restart control signal 90 also resets the allocation pointer of the allocator circuit 36 to indicate a cleared reorder buffer 42, and causes deallocation of all the reservation station entries of the dispatch circuit 38.

The retire control circuit 46 then transfers valid signals to the real register file 44 over the retire control bus 70. The valid signals indicate which ROB entries on the retire data bus 64 are written to the corresponding committed state registers. The valid signals cause the real register file 44 to store the specified result data on the retire data bus 64 into the appropriate committed state registers. The valid signals on the retire control bus 70 are also received by the register alias circuit 34 and the allocator circuit 36. The register alias circuit 34 accordingly updates the rrfv flags, and the allocator circuit 36 accordingly deallocates the retired ROB entries.

The retire control circuit 46 determines an updated value of the architectural instruction pointer for the processor 12 during each retirement operation. The retire control circuit 46 determines an updated instruction pointer value according to target addresses generated by retiring branch micro-ops and according to the instruction pointer delta values of the retiring micro-ops. The retire control circuit 46 also stores the exception data corresponding to the micro-op that causes an exception.

The microinstruction sequencer 30 receives the exception vector over the exception vector bus 92. The microinstruction sequencer 30 then issues micro-ops to instruction decode circuit 26.

Figure 6:
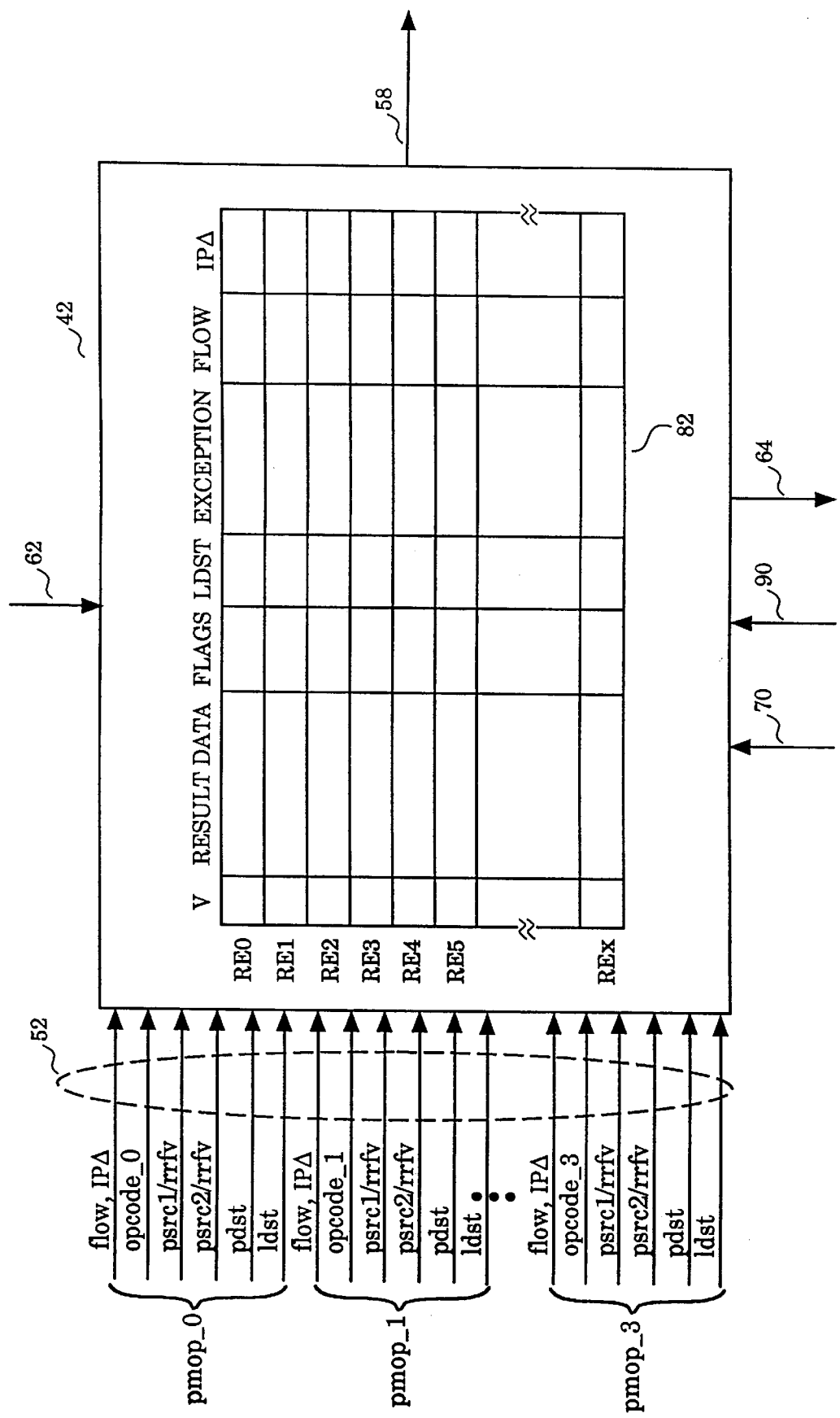
FIG. 6 illustrates the reorder buffer for one embodiment which implements a reorder buffer (ROB) register file comprising a set of ROB entries that buffer speculative result data values from the out-of-order execution of corresponding physical micro-ops.

FIG. 6 illustrates the reorder buffer 42 for one embodiment. The reorder buffer 42 implements a reorder buffer (ROB) register file 82 comprising a set of ROB entries (REO through REx). The ROB entries REO through REx buffer speculative result data values from the out-of-order execution of corresponding physical micro-ops. Each ROB entry comprises a valid flag (V), a result data value, a set of flags, a logical register destination (LDST), exception data, flow markers, and an instruction pointer delta value (IP&).

For one embodiment, the ROB entries REO through REx comprise a set of 64 physical registers.

The valid flag of each ROB entry indicates whether the corresponding result data value is valid. The valid flag is set during the result write back to the ROB entry from the execution circuit 40. The reorder buffer 42 clears the valid flag for each newly allocated ROB entry to indicate an invalid result data.

The result data value of each ROB entry is a speculative result from the out-of-order execution of the corresponding physical micro-op. The result data value may be either an integer data value or a floating-point data value. For one embodiment, the result data value field of each ROB entry REO through REx comprises 86 bits to accommodate both integer and floating-point data values.

The flags of each ROB entry provide speculative architectural flag information. The speculative architectural flag information is transferred to the architectural flags of the real register file 44 upon retirement of the corresponding ROB entry.

The logical register destination LDST of each ROB entry specifies a committed state register in the real register file 44. The result data value of the corresponding ROB entry is transferred to the committed state register specified by LDST during retirement of the ROB entry.

The exception data of each ROB entry contains exception information from execution of the corresponding physical micro-op. The flow markers of each ROB entry relate the ROB entry to the boundaries of the original instruction, and the instruction pointer delta value (IP&) indicates the byte length of the original instruction corresponding to the ROB entry.

The reorder buffer 42 receives the physical micro-ops pmop_0 through pmop_3 over the physical micro-op bus 52. The reorder buffer 42 reads the ROB entries specified by the physical register sources psrc1 and psrc2 of the physical micro-ops from the ROB register file 82. The reorder buffer 42 transfers the result data values and the valid flags from the specified ROB entries over the source data bus 58.

The reorder buffer 42 clears the valid flags of the ROB entries specified by the physical register destination PDST of the physical micro-ops received over the physical micro-op bus 52. The reorder buffer 42 clears the valid flags to indicate that the corresponding result data value is not valid until the execution circuit 40 writes back results for the physical micro-ops.

The reorder buffer 42 then stores the logical register destinations, the flow markers, and the instruction pointer delta values into the corresponding fields of the ROB entries specified by the physical register destinations of the physical micro-ops. The logical register destination in the LDST field of a ROB entry specifies a committed state register in the real register file 44 for retirement of the corresponding ROB entry.

The reorder buffer 42 receives write back results from the execution circuit 40 over the result bus 62. Each write back result on the result bus 62 comprises a result data value and corresponding valid flag, a physical register destination, and exception data.

The reorder buffer 42 stores the write back results from the execution circuit 40 into the ROB entry specified by the physical register destination on the result bus 62. The reorder buffer 42 stores the result data value and corresponding valid flag into the result data value and valid flag fields, and stores the exception data into the exception data field of the ROB entry specified by the physical register destination.

The write back valid flag from the execution circuit 40 sets the valid flag in the specified ROB entry. The write back valid flag indicates that the ROB entry contains a valid result data value and exception data from execution of the corresponding physical micro-op.

Figure 7:
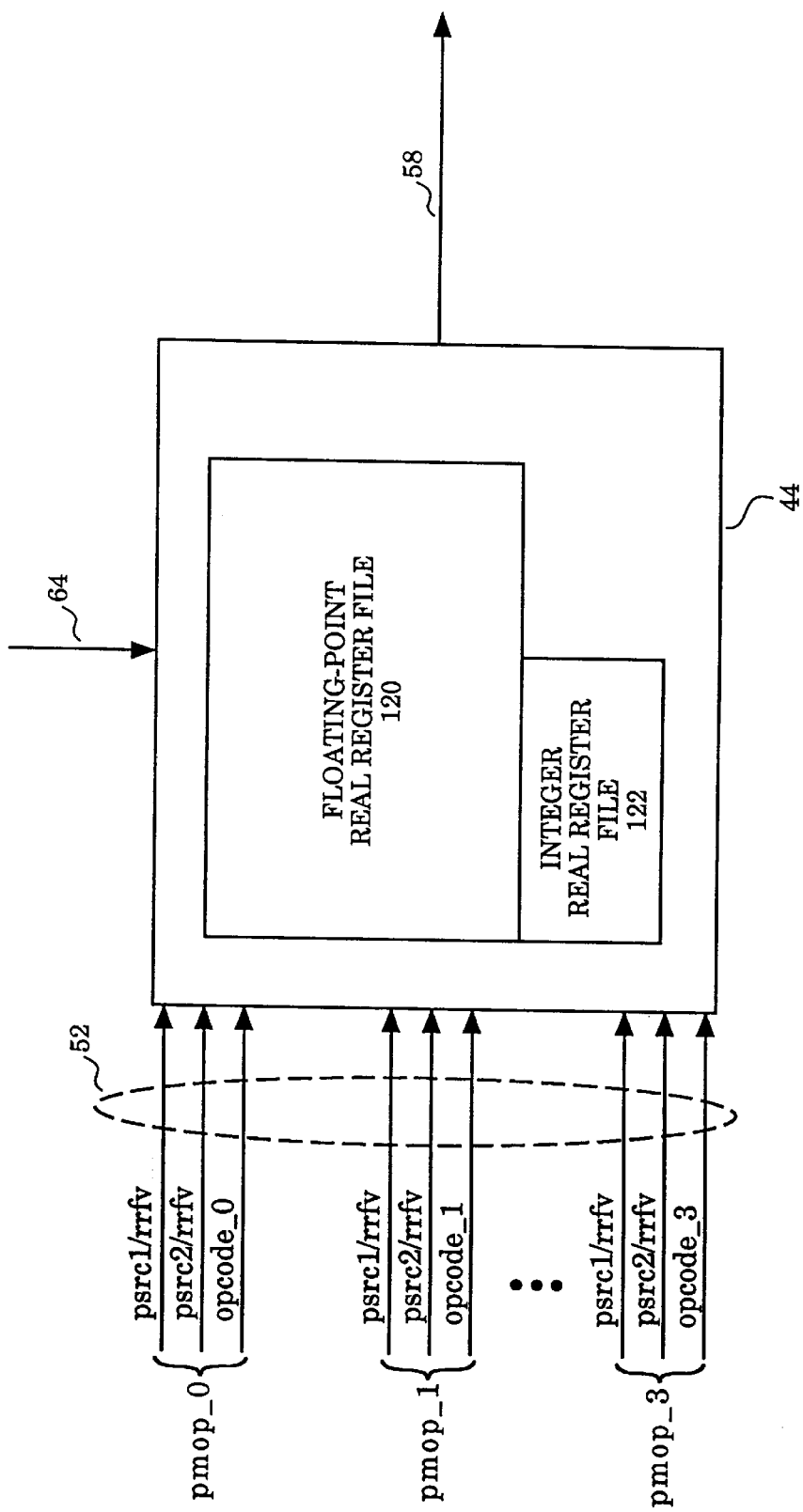
FIG. 7 illustrates the real register file for one embodiment which implements a set of committed state registers that hold committed result data values.

FIG. 7 illustrates the real register file 44 for one embodiment. The real register file 44 implements a set of committed state registers that hold committed result data values. The committed state registers in real register file 44 comprise a floating-point register file 120 and an integer real register file 122.

The committed state registers buffer committed results for the architectural registers of the original stream of instructions. For one embodiment, the committed state registers of the real register file 44 comprise the EAX, EBX, ECX, and EDX registers, etc. and architectural flags of the Intel Architecture Microprocessor.

The real register file 44 receives the physical micro-ops pmop_0 through pmop_3 over the physical micro-op bus 52. The real register file 44 reads the committed state registers specified by the physical register sources psrc1 and psrc2 of the physical micro-ops from the floating-point register file 120 and the integer real register file 122. The real register file 44 transfers the committed result data values from the committed state registers to the dispatch circuit 38 over the source data bus 58. The real register file 44 also transfers a valid flag for each committed result data value to the dispatch circuit 38 over the source data bus 58. The valid flags from the committed state registers always indicate valid source data values.

Figure 8:
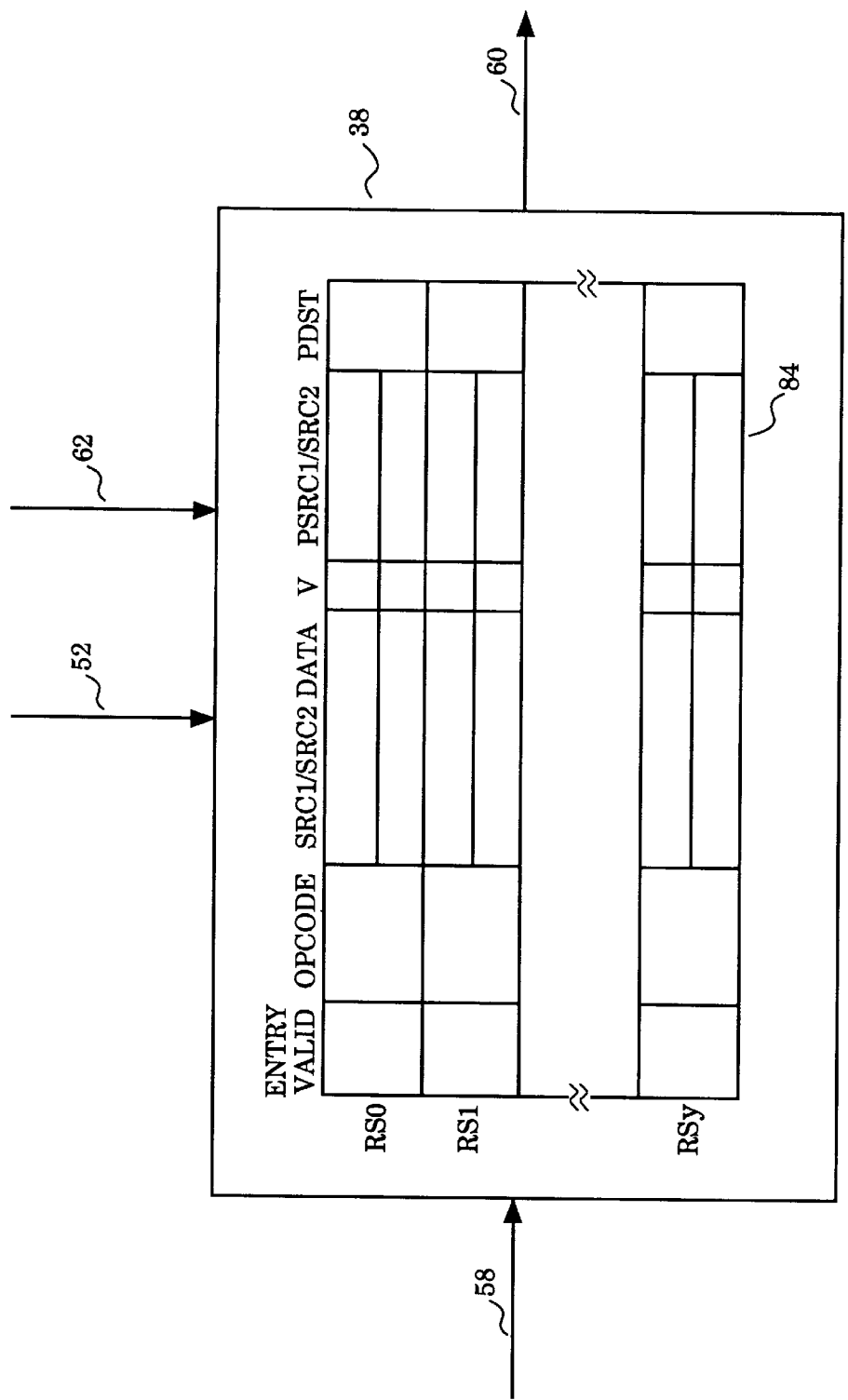
FIG. 8 illustrates the dispatch circuit for one embodiment, and shows a dispatch table comprising a set of reservation station entries RS0 through RSy.

FIG. 8 illustrates the dispatch circuit 38 for one embodiment. The dispatch circuit 38 implements a dispatch table 84 comprising a set of reservation station entries RS0 through RSy. Each reservation station entry RS0 through RSy comprises an entry valid flag, an opcode, a pair of source data values (SRC1/SRC2 DATA) and corresponding source data valid flags (V), a pair of physical register sources (PSRC1/PSRC2), and a physical register destination (PDST).

Figure 9:
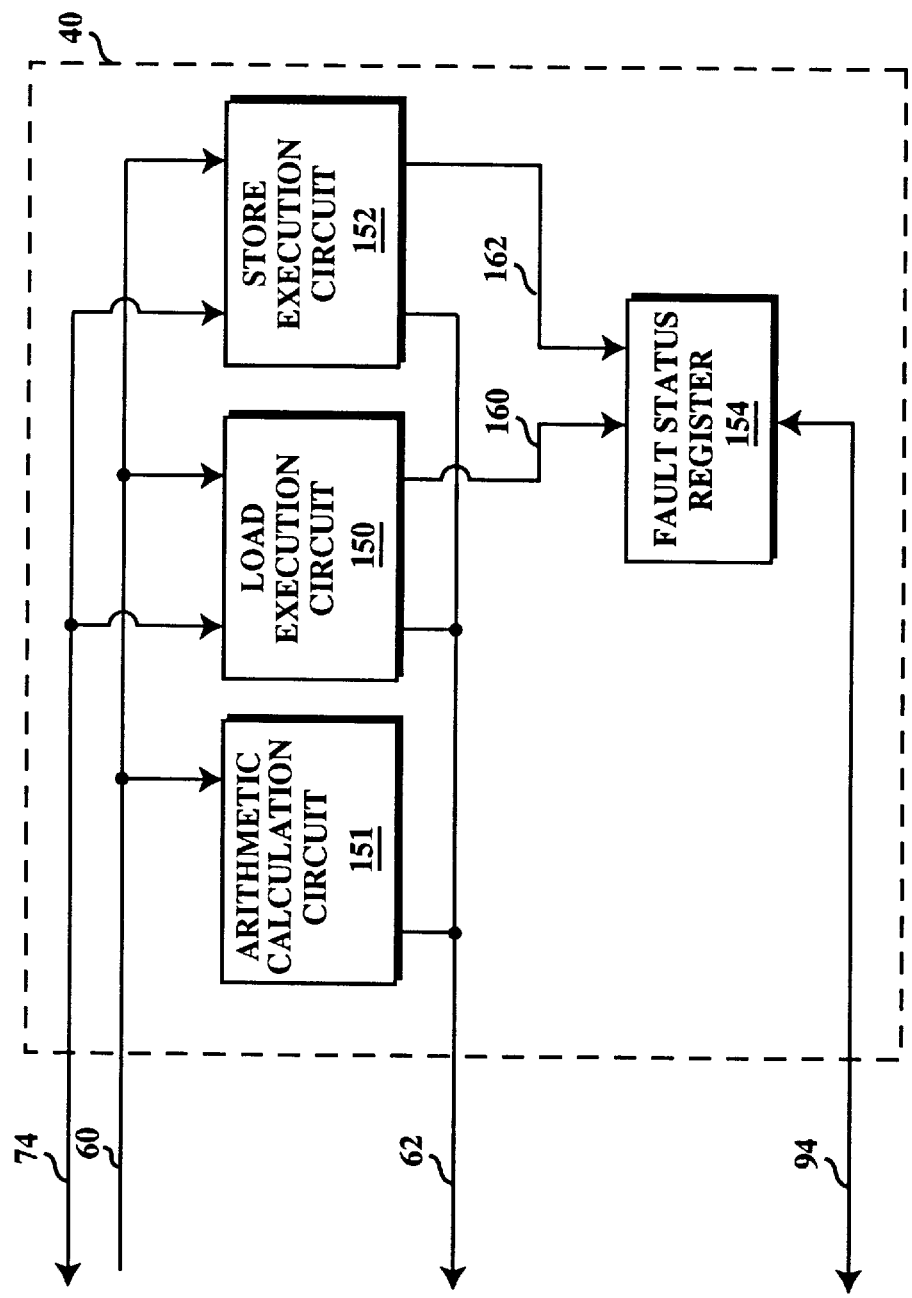
FIG. 9 illustrates execution units in the execution circuit that execute arithmetic, logical memory load and memory store micro-ops for one embodiment.

FIG. 9 illustrates execution units in the execution circuit 40 that execute arthmetic, memory load and memory store micro-ops for one embodiment. The execution circuit 40 comprises a load execution circuit 150, an arithmetic calculation circuit 151, a store execution circuit 152, and a fault status register 154.

The load execution circuit 150 receives dispatched load memory micro-ops from the dispatch circuit 38 over the micro-op dispatch bus 60. The load execution circuit 150 performs the specified load memory operation by accessing the bus interface circuit 22 over the memory access bus 74, and then transfers results and exception data over the result bus 62. If the load execution circuit 150 detects an exception such as a page violation during the load memory operation, then corresponding fault information is written to the fault status register 154 over a bus 160. The fault information includes the memory address causing the exception, the physical destination for the micro-op causing the exception, the type and size of the access and a valid bit indicating that the fault status in the fault status register 154 is valid.

The load execution circuit 150 writes fault information into the fault status register 154 only if the micro-op generating the fault information is older than any fault information already stored in the fault status register 154. An older micro-op is a micro-op occurring earlier in the instruction stream in relation to the micro-op corresponding to any valid fault status in the fault status register 154. The load execution circuit 150 determines the relative age of the faulting micro-op and the valid fault status in the fault status register 154 by comparing the physical destination of the faulting micro-op to the physical destination stored in the fault status register 154. The physical destinations reflect the relative age of micro-ops because the ROB entries in the reorder buffer 42 are allocated sequentially to incoming physical micro-ops in the sequential program order.

The arithmetic calculation circuit 151 receives dispatched arithmetic micro-ops from the dispatch circuit 38 over the micro-ops dispatch bus 60. The arithmetic calculation circuit 151 performs the specified arithmetic operations and then signals results over the result bus 62.

The store execution circuit 152 receives dispatched store memory micro-ops from the dispatch circuit 38 over the micro-op dispatch bus 60. The store execution circuit 152 performs the specified store memory operation to the bus interface circuit 22 over the memory access bus 74, and then signals results over the result bus 62. If the store execution circuit 152 detects an exception such as a page violation during the store memory operation, then corresponding fault information is written to the fault status register 154 over a bus 162. The fault information includes the memory address causing the exception, the physical destination of the micro-op causing the exception, the type and size of the access and the valid bit. The store execution circuit 152 writes fault information into the fault status register 154 only if the micro-op generating the fault information is older than any fault information already stored in the fault status register 154.

An exception handler sequenced by microinstruction sequencer 30 reads the fault information from the fault status register 154 over the control register bus 94. The read of the fault information by the handler clears the valid bit in the fault status register 154.

Figure 10:
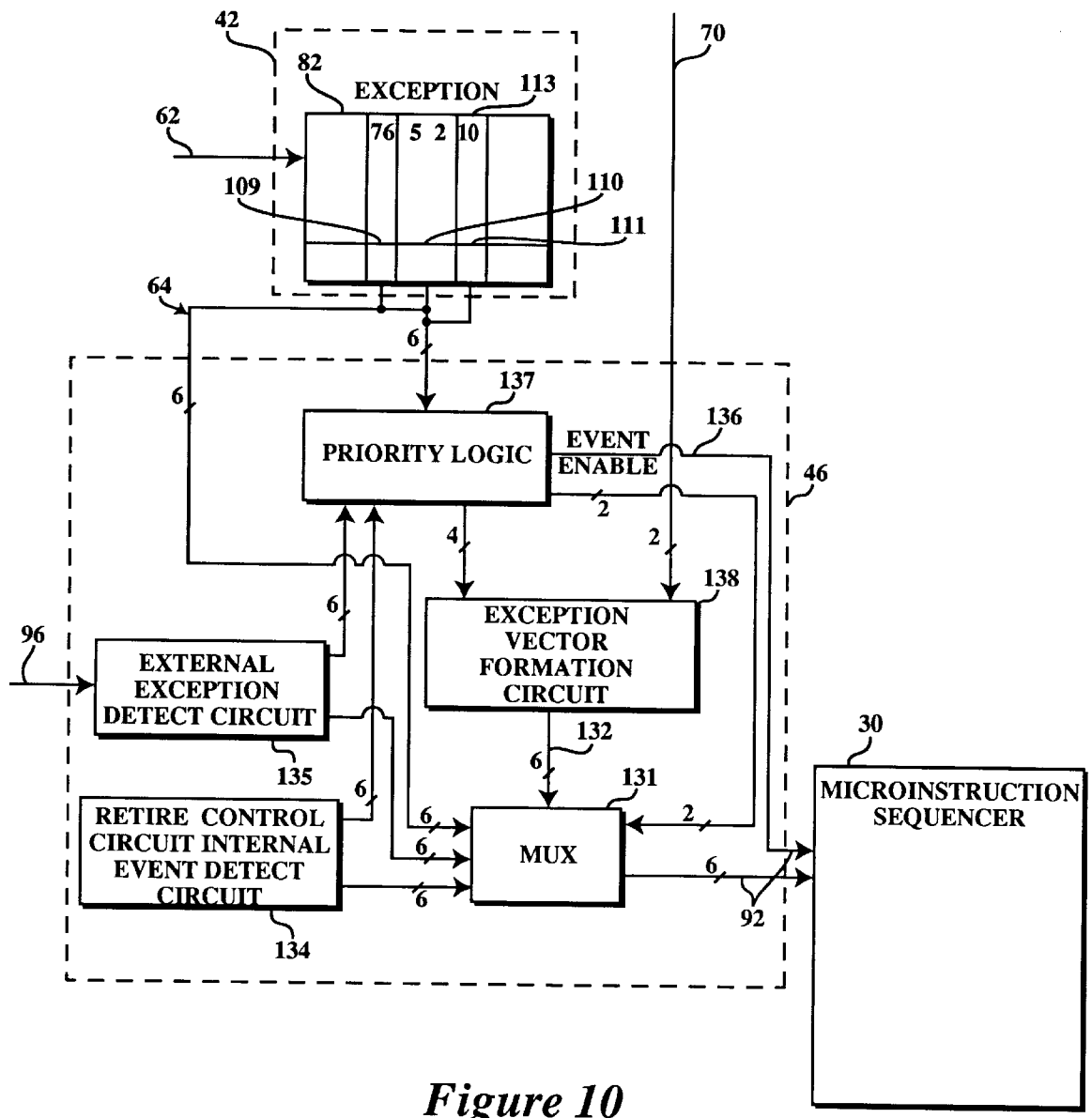
FIG. 10 illustrates circuitry contained within the retire control circuit in order to form a vector which is transmitted to the microinstruction sequencer for calling of an event handler.

FIG. 10 illustrates circuitry contained within retire control circuit 46 for generating event vectors. Event vectors are transmitted over bus 92 to microinstruction sequencer 30. The information transmitted to microinstruction sequencer 30 is generated by multiplexer 131. Multiplexer 131 selects event vectors which are generated by circuits 134, 135, 138 or an assist vector which is stored in ROB register file 82.

Circuit 134 generates events which occur internally in retire control circuit 46. External exception detection circuit 135 receives inputs over bus 96 from bus I/F circuit 22.

Circuits 134 and 135, and two bits 109 in the exception field 113 of ROB register file 82 are input to priority logic circuit 137. If exceptions occur simultaneously, priority logic circuit 137 selects one to pass through to exception vector formation circuit 138.

Exception vector formation circuit 138 generates an exception vector from the information received from priority logic 137 and information over bus 70 received from RRF 44. Multiplexer 131 selects one of the vectors from the input circuits which is passed to microinstruction sequencer 30 on bus 92 according to Table 1 as follows:

TABLE 1

|  | Exception [1] | Exception [0] |
| --- | --- | --- |
| No Exception | 0 | 0 |
| Exception | 0 | 1 |
| Assist | 1 | 0 |
| Other | 1 | 1 |

Figure 11:
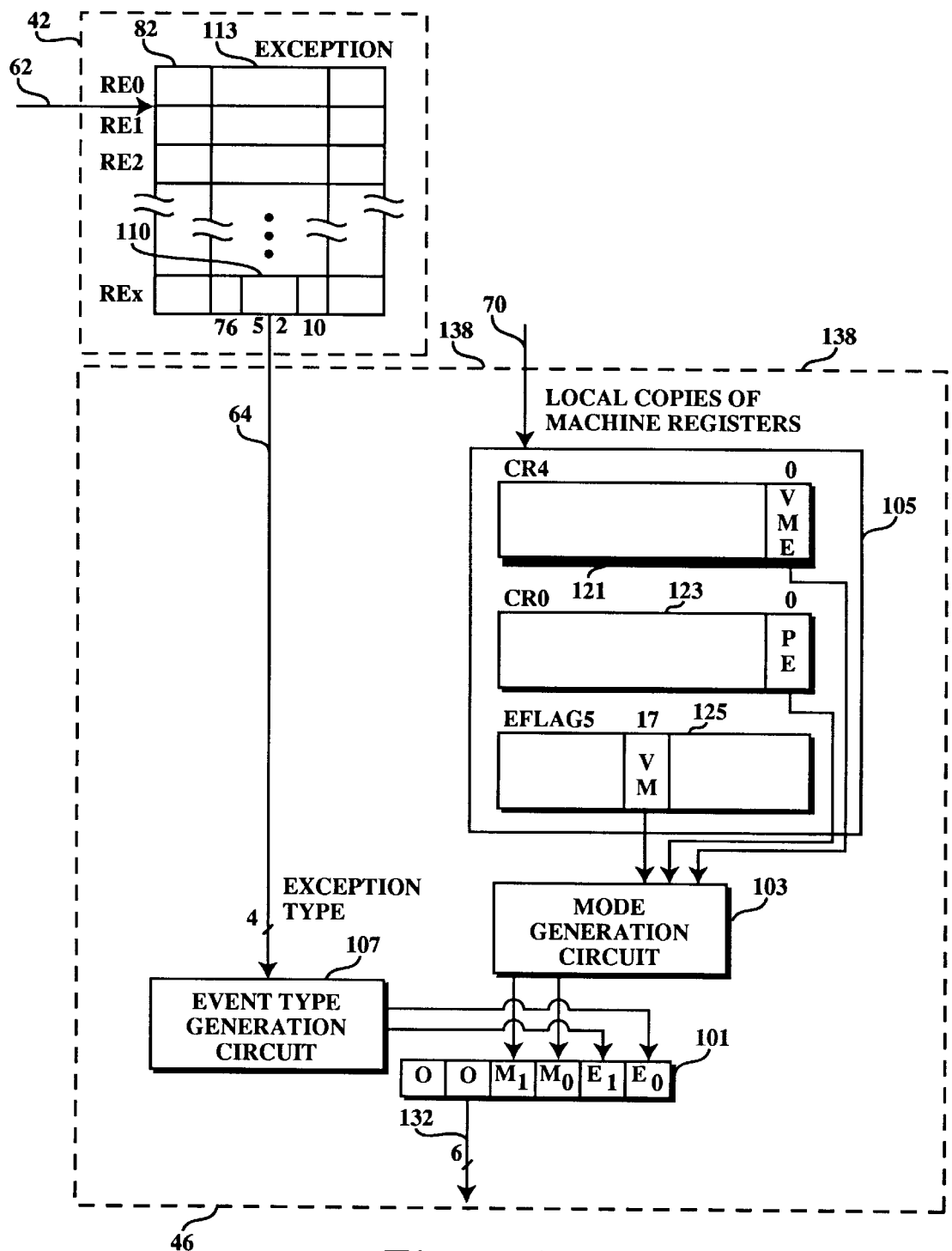
FIG. 11 shows the details of the event formation circuit contained within the retire control circuit.

FIG. 11 illustrates details of the circuitry in exception vector formation circuit 138. It generates an event vector which is used to reference the appropriate microcode event handler. The vector transmitted over bus 132 by circuit 138 is a cross product between a mode of operation of the processor and the event type. The event type indicates whether the event is a fault, a trap, a software interrupt, or a hardware interrupt. This information is obtained from the event encoding contained in field 110 (bits 5–2) within exception field 113 in ROB register file 82.

Figure 12A:
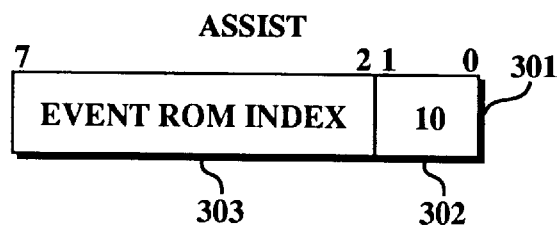
FIGS. 12a and 12b show formats of assists and exceptions in implemented embodiments of the present invention.

An assist reported in the exception field 113 of ROB register file 82 has the format 301 as shown in FIG. 12a. An assist is a microcode routine requested by hardware to assist the hardware in handling a special condition which it cannot handle alone. For example, in the Intel architecture when a page walk is occurring, access bits in the page-table entry and the page-table directory need to be set if they are not set. The hardware can invoke a microcode routine using this mechanism which assists the hardware in re-walking the page-table and setting the bits if they are not set. Other types of actions which the hardware cannot do by itself may also require the flagging and servicing of assists.

The least significant two bits 302 of the assist information contains the code 10 indicating an assist. In the case of an assist, the six most significant bits 303 of the exception information contains an event ROM index. This is used by microinstruction sequencer 30 to determine the appropriate assist handler to invoke.

Figure 12B:
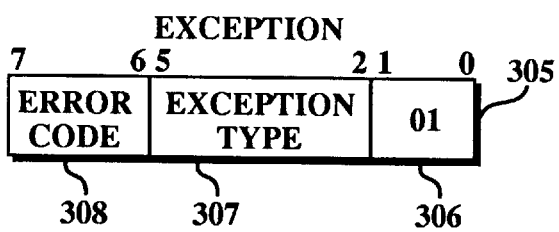

An exception reported in the exception field 113 of ROB register file 82 has the format shown in FIG. 12b. An exception 305 contains the code 01 in the two least significant bits 306 of exception field 305. Bits 2–5 within field 307 indicate the exception type. Bits 7–8 contain an error code 308.

Figure 13:
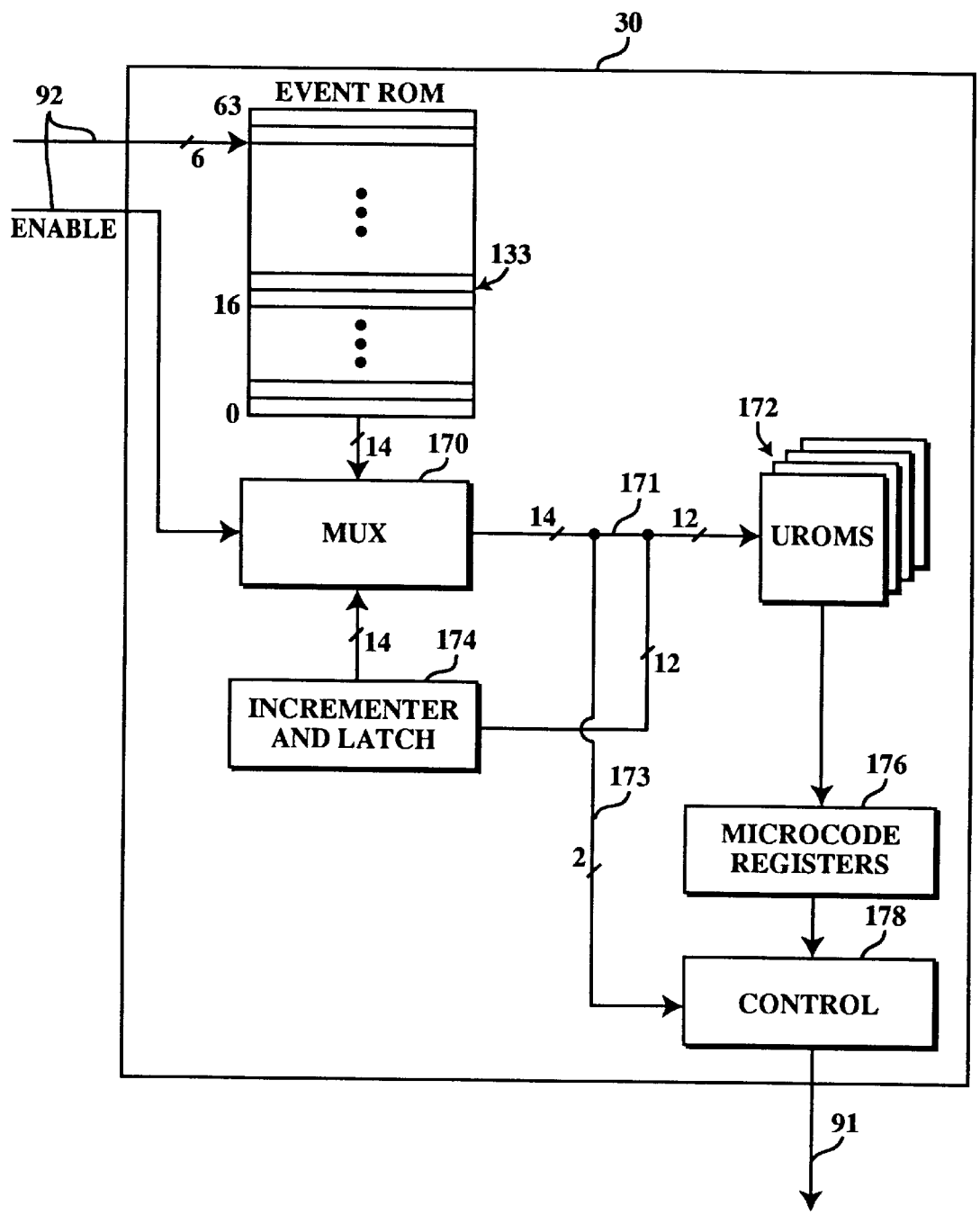
FIG. 13 shows a portion of the microinstruction sequencer which generates event handler vectors and sequences the event handler.

The two least significant bits 111 of exception information 113 are input into multiplexer 131 via priority logic 137 which selects which information will be transmitted over bus 92. This includes one of the vectors from circuitry 134, 135, or 138 or an assist index. In the case of an exception, the formed exception vector is passed and used to address the first sixteen locations of an event ROM 133 in microinstruction sequencer 30 as shown in FIG. 13.

The exception vector is formed in register 101 as illustrated in FIG. 11. It is generated from the operating mode of the processor and the event type. The exception type is extracted from field 110 in exception information 113 or from circuits 134 or 135. These four bits indicating the event type are passed to an event type generation circuit 107 via bus 64. Circuit 107 includes wired logic which generates two bits of exception type information $E_1$ and $E_0$ depending upon the type of exception as shown in Table 2 below.

TABLE 2

|  | [Type:5:2] | $E_1$ | $E_0$ |
| --- | --- | --- | --- |
| Fault | 0000 | 0 | 0 |
| Trap | 1100 | 0 | 1 |
| Software Interrupt | 1101 | 1 | 0 |
| Hardware Interrupt | 1111 | 1 | 1 |

The exception type information $E_1 E_0$ is used for the least significant bits of the 6 bit exception vector formed in exception vector formation register 101. Two other bits of the exception vector formed in exception vector register 101 contain mode information. Mode information is generated from three general purpose registers in the Intel architecture processor. The retire control circuit 46 maintains local copies 105 of the registers CR4 121, CR0 123, and the EFLAGS register 125. Specified bits from each of these registers as shown in FIG. 11 indicate the operating mode of the processor. Local copies of registers 121, 123, & 125 are obtained from the real register file 44 over bus 70.

The virtual mode extensions (VME) bit 0 of the CR4 register 121, the protection enable (PE) bit 0 from the CR0 register 123, and bit 17, the virtual mode (VM) flag from the EFLAGS register 125 are used for formation of mode information $M_1 M_0$. The mode information is formed by a wired logic in mode generation circuit 103 according to the different operating modes of the processor. These are shown in Table 3 as follows:

TABLE 3

| Mode | CR0(0) | CR4(0) | VM | $M_1$ | $M_0$ |
| --- | --- | --- | --- | --- | --- |
| Real | 0 | X | X | 0 | 0 |
| Protected | 1 | X | 0 | 0 | 1 |
| Virtual-8086 | 1 | 0 | 1 | 1 | 0 |
| VME | 1 | 1 | 1 | 1 | 1 |

The event type information $E_1 E_0$ from event type generation circuit 107 is concatenated or combined with mode information $M_1 M_0$ from mode generation circuit 103 in register 101. These bits are zero filled in order to form a 6 bit exception vector which is transmitted to multiplexer 131 over bus 132.

Microinstruction sequencer 30 receives the event vector over bus 92 as shown in FIG. 10. The 6 bit event vector is then used as a reference into an event ROM 133 illustrated in FIG. 13 which contains a plurality of references to microcode event handler routines. The event ROM 133 contains 14 bit pointers to the microcode event handlers which will service the exception or the assist. Different entries contained within the event ROM 133 may reference the same event handlers for different modes and/or exception types. The first sixteen locations of the event ROM 133 are addressed by exception vectors and the remaining 48 are addressed by assists. Event ROM 133 generates a 14 bit event microcode handler vector which is transmitted to a multiplexer 170.

An enable line carried on bus 92 is also input to multiplexer 170. Responsive to the driving of the event vector and enable line over bus 92, multiplexer 170 forwards the microcode handler vector over bus 171 to UROM's 172 containing the microcode event handler. The two least significant bits of the 14 bit event vector are carried on bus 173 which is sent to control logic 178. The remaining 12 bits of the microcode handler event vector are sent to UROM's 172 for accessing of the first four micro-ops of the event handler out of UROM's 172.

The 12 bit microcode handler vector is also input to incrementor and latch 174 which drives the multiplexer 170 to sequence locations in UROM's 172. Micro-ops are sequentially accessed from UROM's 172 by incrementor and latch 174. Sequencing continues until the handler has been completely accessed.

Four micro-ops are accessed from UROM's 172 simultaneously. These are deposited into registers 176 which feed control circuit 178. Control circuit 178 provides the micro-ops comprising the event handler to bus 91 in sequence to instruction decode circuit 26.

The microcode event handler is sequentially accessed by microcode sequencer 30 via multiplexer 170, incrementor and latch 174, and micro-op code registers 176. Then, control circuit 178 makes the micro-op available over bus 91 to instruction decode circuit 26.

Because the exception vector formation circuit 138 combines the exception information and operating mode information together to form an exception vector, which is then used to access an event ROM 133, handling of exceptions and a processor is much more efficient than in the prior art. Because conditional branching does not need to be performed within the microcode event handlers themselves, events are serviced more efficiently than in the prior art, especially in an out-of-order processor. The avoidance of conditional branching within the handlers themselves makes execution much faster, and overall execution within the processor much more efficient.

Figure 14:
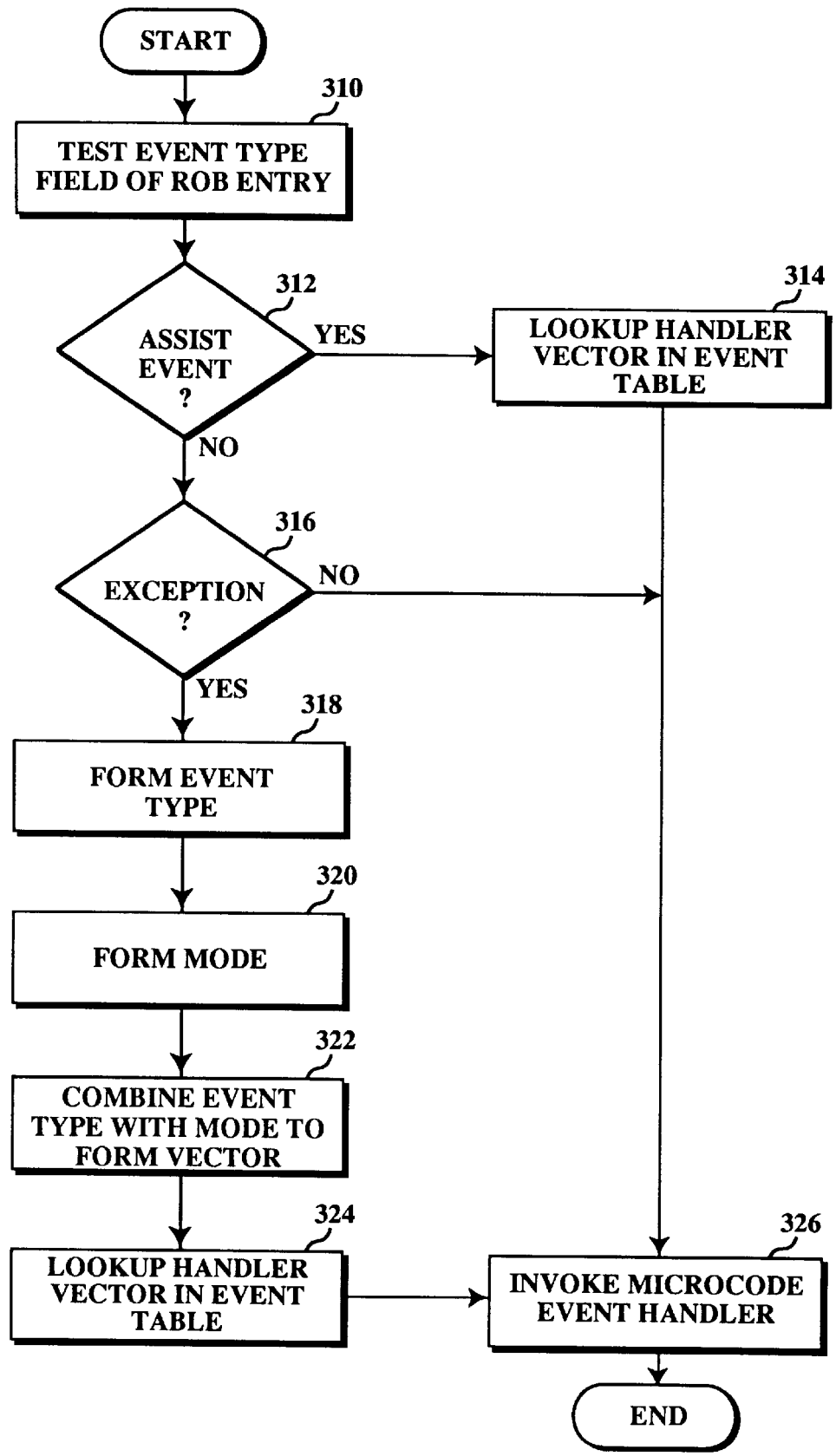
FIGS. 14 shows a method for forming an event vector which is used to reference an event handler vector in an event ROM.

A series of method steps which may be performed in the absence of dedicated hardware such as that shown in FIGS. 10 and 11 is illustrated with reference to FIG. 14. For example, block 310 may perform a test to determine the contents of the event type field of the ROB register file entry. If the field indicates an assist event, as detected in block 312, then the 6 bit vector extracted from the ROB entry may be used to reference a microcode assist handler, e.g., in a look up table at step 314. Then, at step 326, the microcode event handler is invoked and the process is thus complete.

In the case of an exception, as detected at step 316, the process can then form the event type information at 318 according to table 2. Concurrently or subsequently to the formation or the event type information, the mode information may be formed at step 320 according to table 3. Subsequent of the formation of the mode and the event type information, at step 322, the event type can be combined with or concatenated to the operating mode to form the exception vector at step 322. Subsequent to formation of the exception vector at step 322, at step 324. The microcode handler vector can be generated, e.g., by reference to a look up table. Then, at step 326, the microcode event handler may be invoked, and subsequent thereto, the process is thus complete.

Thus, the foregoing mechanism and method removes the need for mode specific conditional branches within microcode exception handlers, thereby reducing the penalties paid by unique exception handler calls. This is especially so in an out-of-order processor. The generation of an exception vector, which is input to an event ROM in the microinstruction sequencer provides a more efficient means for referencing the event handlers, to avoid any conditional checks within the event handlers themselves. Thus mode and event types specific operation may be performed within the processor, according to implementation choice. It will be appreciated that though the foregoing has been described especially with reference to specific embodiment of FIGS. 1–14, that many modifications made be made, by one skilled in the art, without departing from the scope of the invention as described here. The invention is thus to be viewed as limited only by the appended claims which follow.

What is claimed is:

1. An apparatus for handling events comprising:

a. a mode generation circuit for generating mode information indicating one of a plurality of operating modes as a current operating mode of a processor, wherein each of said plurality of operating modes supports a different operating system scheme, and wherein different microcode instructions must be executed to handle certain events in the different operating system schemes;

b. an event type generation circuit for generating event type information upon the occurrence of events in said processor;

c. an event vector formation circuit coupled to said mode generation circuit and said event type generation circuit for combining said event type information and said mode information to generate event vectors; and d. a microcode event handler vector generation circuit coupled to said event vector formation circuit for generating microcode event handler vectors from said event vectors for invoking microcode event handlers to handle said occurrence of said events in said processor, wherein said microcode event handler vector generation circuit is resident in a microinstruction sequencer, and said microcode event handlers are invoked from said microinstruction sequencer.

2. The apparatus of claim 1 wherein said event vector formation circuit is resident in a retire control circuit and said apparatus is operative upon retirement of execution of instructions in said processor.

3. The apparatus of claim 1 wherein said microcode event handler vector generation circuit includes a lookup table.

4. The apparatus of claim 3 wherein said lookup table includes the same microcode event handler vectors stored in different locations of said lookup table.

5. The apparatus of claim 3 wherein said lookup table further comprises entries for referencing assists.

6. The apparatus of claim 1 wherein said event type information includes whether an event is a fault, a trap, a hardware interrupt or a software interrupt.

7. The apparatus of claim 1 wherein said mode information includes whether said processor is operating in real, protected, virtual-8086, or virtual memory extensions operating modes.

8. An apparatus comprising:

a. an event vector formation circuit for combining event type information indicating a type of event in a processor and mode information indicating a current operating mode of said processor to generate an event vector, wherein said current operating mode is one of a plurality of operating modes that each support a different operating system scheme, and wherein different microcode instructions must be executed to handle certain events in the different operating system schemes; and b. a microcode event handler vector generation circuit coupled to said event vector formation circuit for generating a microcode event handler vector from said event vector for invoking a microcode event handler, wherein said microcode event handler vector generation circuit is resident in a microinstruction sequencer, and said microcode event handler is invoked from said microinstruction sequencer.

9. The apparatus of claim 8 wherein said event vector formation circuit is resident in a retire control circuit and said apparatus is operative upon retirement of execution of instructions in said processor.

10. The apparatus of claim 8 wherein said microcode event handler vector generation circuit includes a lookup table.

11. The apparatus of claim 10 wherein said lookup table includes the same microcode event handler vectors stored in different locations of said lookup table.

12. The apparatus of claim 10 wherein said lookup table further comprises entries for referencing assists.

13. The apparatus of claim 8 wherein said event type information includes whether an event is a fault, a trap, a hardware interrupt or a software interrupt.

14. The apparatus of claim 8 wherein said mode information includes whether said processor is operating in real, protected, virtual-8086, or virtual memory extensions operating modes.

15. The apparatus of claim 8 further comprising a microcode event handler sequencing circuit coupled to said microcode event handler vector formation circuit for sequencing said microcode event handler in order for said processor to execute said microcode event handler.

16. An apparatus comprising:

a. a first means for combining event type information indicating a type of event in a processor and mode information indicating a current operating mode of said processor to generate an event vector, wherein said current operating mode is one of a plurality of operating modes that each support a different operating system scheme, and wherein different microcode instructions must be executed to handle certain events in the different operating system schemes; and b. a second means coupled to said first means for generating a microcode event handler vector from said event vector for invoking a microcode event handlers, wherein said second means is resident in a microinstruction sequencing means, and said microcode event handler is invoked from said microinstruction sequencing means.

17. The apparatus of claim 16 wherein said first means is resident in a retire control means and said apparatus is operative upon retirement of execution of instructions in said processor.

18. The apparatus of claim 16 wherein said second means includes a lookup table.

19. The apparatus of claim 18 wherein said lookup table includes the same microcode event handler vectors stored in different locations of said lookup table.

20. The apparatus of claim 18 wherein said lookup table further comprises entries for referencing assists.

21. The apparatus of claim 16 wherein said event type information includes whether an event is a fault, a trap, a hardware interrupt or a software interrupt.

22. The apparatus of claim 16 wherein said mode information includes whether said processor is operating in real, protected, virtual-8086, or virtual memory extensions operating modes.

23. The apparatus of claim 16 further comprising a microinstruction sequencing means coupled to said second means for sequencing said microcode event handler in order for said processor to execute said microcode event handler.

24. A method comprising the following steps:

a. combining event type information indicating a type of event in a processor with mode information indicating one of a plurality of operating modes as a current operating mode of said processor to generate an event vector, wherein each of said plurality of operating modes supports a different operating system scheme, and wherein different microcode instructions must be executed to handle certain events in the different operating system schemes;

b. generating a microcode event handler vector from said event vector; and c. invoking a microcode event handler using said microcode event handler vector, wherein said microcode event handler is invoked from a microinstruction sequencer.

25. The method of claim 24 where said method is operative upon retirement of execution of instructions in said processor.

26. The method of claim 24 wherein said step of generating a microcode event handler vector from said event vector includes looking up said microcode event handler vector in a lookup table.

27. The method of claim 26 wherein said lookup table includes the same microcode event handler vectors stored in different locations of said lookup table.

28. The method of claim 26 wherein said lookup table further includes entries for referencing assists.

29. The method of claim 24 wherein said event type information includes whether an event is a fault, a trap, a hardware interrupt or a software interrupt.

30. The method of claim 24 wherein said mode information includes whether said processor is operating in real, protected, virtual-8086, or virtual memory extensions operating modes.

31. The method of claim 24 wherein said step of invoking said microcode event handler using said microcode event handler vector upon occurrences of events in said processor includes sequencing said microcode event handler in a microinstruction sequencer in order for said processor to execute said microcode event handler.

32. The method of claim 25 further comprising the preliminary steps of: generating said mode information; and generating said event type information upon the occurrence of an event of said type in said processor.

33. A processor operable in a plurality of operating modes, each of said plurality of operating mode supporting a different operating system scheme, said processor comprising:

a table in a microinstruction sequencer containing a first plurality of microcode event handler vectors that each identify a different microcode event handler to be executed for each of the different operating system schemes to handle a first type of event; and an event vector formation circuit, coupled to said table, to generate a different event vector for the first type of event based on which of said plurality of operating modes said processor is currently operating, each of said different event vectors identifying a different one of said first plurality of microcode event handler vectors in said table.

34. The processor of claim 33, wherein:

said table further contains a second plurality of microcode event handler vectors that each identify the same microcode event handler to be executed for each of the different operating system schemes to handle a second type of event; and said event vector formation circuit also generates a different event vector for the second type of event based on which of said plurality of operating modes said processor is currently operating, each of said different event vectors for said second type of event identifying a different one of said second plurality of microcode event handler vectors in said table.

35. The processor of claim 33, wherein said first type of event may be a fault, trap, hardware interrupt, or software interrupt.

36. The processor of claim 33, wherein each of said plurality of operating modes provides at least one of a different event handling scheme, a different address translation scheme, and a different memory protection scheme.

37. A method for executing different sets of microcode instructions for the same type of event based on which of a plurality of modes a processor is currently operating, said method comprising the computer-implemented steps of:

using one said plurality of operating system schemes, where each of said plurality of operating system schemes requires a different technique be used to prepare said processor for execution of a non-microcode event handler stored in a memory coupled to said processor;

selecting one of said plurality of modes as a currently selected operating mode based on which of a plurality of operating system schemes is being used;

recognizing an occurrence of a first type of event; and selecting one of said different sets of microcode instructions for said occurrence of said first type of event based on said currently selected operating mode without performing a microcode conditional branch operation.

38. The method of claim 37, wherein said step of selecting one of said different sets of microcode instructions includes the step of:

generating an event vector based on said first type of event and said currently selected operating mode;

generating a microcode event handler vector from said event vector, said microcode event handler vector identifying the one of said different sets of microcode instructions for said occurrence.

39. The method of claim 37, further comprising the steps of:

recognizing an occurrence of a second type of event; and selecting the same set of microcode instructions for said occurrence of said second type of event regardless of said currently selected operating mode.

40. An apparatus for handling events comprising:

a. a mode generation circuit for generating mode information indicating one of a plurality of operating modes as a current operating mode of a processor, wherein each of said plurality of operating modes supports a different operating system scheme, and wherein different microcode instructions must be executed to handle certain events in the different operating system schemes;

b. an event type generation circuit for generating event type information upon the occurrence of events in said processor;

c. an event vector formation circuit coupled to said mode generation circuit and said event type generation circuit for combining said event type information and said mode information to generate event vectors; and d. a microcode event handler vector generation circuit coupled to said event vector formation circuit for generating microcode event handler vectors from said event vectors for invoking microcode event handlers to handle said occurrence of said events in said processor, wherein said microcode event handler vector generation circuit includes a lookup table, and wherein said lookup table further comprises entries for referencing assists.

41. The apparatus of claim 40 wherein said event vector formation circuit is resident in a retire control circuit and said apparatus is operative upon retirement of execution of instructions in said processor.

42. The apparatus of claim 40 wherein said microcode event handler vector generation circuit is resident in a microinstruction sequencer, and said microcode event handlers are invoked from said microinstruction sequencer.

43. The apparatus of claim 40 wherein said lookup table includes the same microcode event handler vectors stored in different locations of said lookup table.

44. The apparatus of claim 40 wherein said event type information includes whether an event is a fault, a trap, a hardware interrupt or a software interrupt.

45. The apparatus of claim 40 wherein said mode information includes whether said processor is operating in real, protected, virtual-8086, or virtual memory extensions operating modes.

46. An apparatus comprising:

a. an event vector formation circuit for combining event type information indicating a type of event in a processor and mode information indicating a current operating mode of said processor to generate an event vector, wherein said current operating mode is one of a plurality of operating modes that each support a different operating system scheme, and wherein different microcode instructions must be executed to handle certain events in the different operating system schemes; and b. a microcode event handler vector generation circuit coupled to said event vector formation circuit for generating a microcode event handler vector from said event vector for invoking a microcode event handler, wherein said microcode event handler vector generation circuit includes a lookup table, wherein said lookup table further comprises entries for referencing assists.

47. The apparatus of claim 46 wherein said event vector formation circuit is resident in a retire control circuit and said apparatus is operative upon retirement of execution of instructions in said processor.

48. The apparatus of claim 46 wherein said microcode event handler vector generation circuit is resident in a microinstruction sequencer, and said microcode event handler is invoked from said microinstruction sequencer.

49. The apparatus of claim 46 wherein said lookup table includes the same microcode event handler vectors stored in different locations of said lookup table.

50. The apparatus of claim 46 wherein said event type information includes whether an event is a fault, a trap, a hardware interrupt or a software interrupt.

51. The apparatus of claim 46 wherein said mode information includes whether said processor is operating in real, protected, virtual-8086, or virtual memory extensions operating modes.

52. The apparatus of claim 46 further comprising a microcode event handler sequencing circuit coupled to said microcode event handler vector formation circuit for sequencing said microcode event handler in order for said processor to execute said microcode event handler.

53. An apparatus comprising:
  a. a first means for combining event type information indicating a type of event in a processor and mode information indicating a current operating mode of said processor to generate an event vector, wherein said current operating mode is one of a plurality of operating modes that each support a different operating system scheme, and wherein different microcode instructions must be executed to handle certain events in the different operating system schemes; and
  b. a second means coupled to said first means for generating a microcode event handler vector from said event vector for invoking a microcode event handler, wherein said second means includes a lookup table, wherein said lookup table further comprises entries for referencing assists.

54. The apparatus of claim 53 wherein said first means is resident in a retire control means and said apparatus is operative upon retirement of execution of instructions in said processor.

55. The apparatus of claim 53 wherein said second means is resident in a microinstruction sequencing means, and said microcode event handler is invoked from said microinstruction sequencing means.

56. The apparatus of claim 53 wherein said lookup table includes the same microcode event handler vectors stored in different locations of said lookup table.

57. The apparatus of claim 53 wherein said event type information includes whether an event is a fault, a trap, a hardware interrupt or a software interrupt.

58. The apparatus of claim 53 wherein said mode information includes whether said processor is operating in real, protected, virtual-8086, or virtual memory extensions operating modes.

59. The apparatus of claim 53 further comprising a microinstruction sequencing means coupled to said second means for sequencing said microcode event handler in order for said processor to execute said microcode event handler.

60. A method comprising the following steps:
  a. combining event type information indicating a type of event in a processor with mode information indicating one of a plurality of operating modes as a current operating mode of said processor to generate an event vector, wherein each of said plurality of operating modes supports a different operating system scheme, and wherein different microcode instructions must be executed to handle certain events in the different operating system schemes;
  b. generating a microcode event handler vector from said event vector, wherein said step of generating a microcode event handler vector from said event vector includes looking up said microcode event handler vector in a lookup table, and wherein said lookup table further includes entries for referencing assists; and
  c. invoking a microcode event handler using said microcode event handler vector.

61. The method of claim 60 where said method is operative upon retirement of execution of instructions in said processor.

62. The method of claim 60 wherein said microcode event handler is invoked from a microinstruction sequencer.

63. The method of claim 60 wherein said lookup table includes the same microcode event handler vectors stored in different locations of said lookup table.

64. The method of claim 60 wherein said event type information includes whether an event is a fault, a trap, a hardware interrupt or a software interrupt.

65. The method of claim 60 wherein said mode information includes whether said processor is operating in real, protected, virtual-8086, or virtual memory extensions operating modes.

66. The method of claim 60 wherein said step of invoking said microcode event handler using said microcode event handler vector upon occurrences of events in said processor includes sequencing said microcode event handler in a microinstruction sequencer in order for said processor to execute said microcode event handler.

67. The method of claim 61 further comprising the preliminary steps of:
  generating said mode information; and
  generating said event type information upon the occurrence of an event of said type in said processor.

* * * * *

UNITED STATES PATENT AND TRADEMARK OFFICE
CERTIFICATE OF CORRECTION

PATENT NO. : 5,889,982
DATED : March 30, 1999
INVENTOR(S) : Rodgers, et al

It is certified that error appears in the above-identified patent and that said Letters Patent is hereby corrected as shown below:

Col. 2, line 46, after "type.", please insert -- Thus, the Intel brand processor modes represent modes of a processor that each provide hardware/microcode support for different operating system schemes (e.g., event handling, address translation, memory protection, etc.), where different microcode instructions must be executed to handle certain events in the different operating system schemes. --

Signed and Sealed this

Twenty-ninth Day of February, 2000

Attest:

Q. TODD DICKINSON

Attesting Officer

Commissioner of Patents and Trademarks

UNITED STATES PATENT AND TRADEMARK OFFICE
CERTIFICATE OF CORRECTION

PATENT NO. : 5,889,982  
DATED : July 1, 1995  
INVENTOR(S) : Scott D. Rodgers

It is certified that error appears in the above-identified patent and that said Letters Patent is hereby corrected as shown below:

<u>Column 2,</u>
Line 46, after "type.", please insert -- Thus, the Intel brand processor modes represent modes of a processor that each provide hardware/microcode support for different operating system schemes (e.g., event handling, address translation, memory protection, etc.), where different microcode instructions must be executed to handle certain events in the different operating system schemes. --

Signed and Sealed this

First Day of June, 2004

JON W. DUDAS  
*Acting Director of the United States Patent and Trademark Office*